(12) United States Patent
Matumura et al.

(10) Patent No.: US 8,601,224 B2
(45) Date of Patent: Dec. 3, 2013

(54) CONTROL UNIT FOR STORAGE APPARATUS AND METHOD FOR CONTROLLING STORAGE APPARATUS

(75) Inventors: Tadashi Matumura, Kawasaki (JP); Masahiro Yoshida, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 475 days.

(21) Appl. No.: 12/534,951

(22) Filed: Aug. 4, 2009

(65) Prior Publication Data

US 2010/0058005 A1  Mar. 4, 2010

(30) Foreign Application Priority Data

Aug. 29, 2008  (JP) .................................. 2008-221458

(51) Int. Cl.
*G06F 12/00* (2006.01)
(52) U.S. Cl.
USPC .................................. 711/154; 711/E12.069
(58) Field of Classification Search
USPC ......................................................... 711/154
See application file for complete search history.

(56) References Cited

U.S. PATENT DOCUMENTS

| | | | |
|---|---|---|---|
| 6,633,538 B1 | 10/2003 | Tanaka et al. | |
| 7,418,624 B2 | 8/2008 | Ichikawa et al. | |
| 7,640,411 B2 * | 12/2009 | Ito et al. | 711/162 |
| 7,747,835 B1 * | 6/2010 | Chatterjee et al. | 711/170 |
| 2004/0153740 A1 * | 8/2004 | Fujimoto | 714/7 |

FOREIGN PATENT DOCUMENTS

| | | |
|---|---|---|
| JP | 10-333838 | 12/1998 |
| JP | 11-220466 | 8/1999 |
| JP | 2001-195201 | 7/2001 |
| JP | 2006-12004 | 1/2006 |

OTHER PUBLICATIONS

Japanese Office Action issued Aug. 3, 2010 in corresponding Japanese Patent Application 2008-221458.

\* cited by examiner

*Primary Examiner* — Manorama Padmanabhan
*Assistant Examiner* — Hamdy S Ahmed
(74) *Attorney, Agent, or Firm* — Staas & Halsey LLP

(57) ABSTRACT

Each CM retains a function management table in which entry information indicating which function is operating in which CM for what period is registered. Every time a command is executed in a function processing unit on the basis of an instruction from a GUI, components of a CM perform control, communicating registered pieces of content in a function management table to corresponding components of another CM for synchronization among the CMs. Regardless of which of a plurality of CMs in a storage apparatus is a master, processing can be executed in any CM from any GUI without inconsistency in the processing between the CMs.

17 Claims, 18 Drawing Sheets

FIG. 2

| FUNCTION VALUE | CONTROL CM MID | UPDATE TIME STAMP | NUMBER OF TIMES OF UPDATE FAILURE |
|---|---|---|---|
| FUNCTION#1 | CM #1 | 2007/1/1 1:02 | 0 |
| FUNCTION#2 | CM #1 | 2007/1/1 1:02 | 1 |
| FUNCTION#3 | CM #2 | 2007/1/1 1:02 | 2 |

FIG. 3

| | | ENTRY INFORMATION IN FUNCTION MANAGEMENT TABLE | | | |
|---|---|---|---|---|---|
| | | VALID | | | INVALID |
| INPUT | | CM | CM1 | CM2 | |
| FUNCTION IS BEING EXECUTED | CM | 1 UPDATE (DISTRIBUTE) | 2 CHANGE (CM) (DISTRIBUTE) | 3 CHANGE (CM) (DISTRIBUTE) | 4 ADD (CM) (DISTRIBUTE) |
| | CM1 | 5 NO CHANGE | 6 UPDATE (CM1) | 7 NO CHANGE OR CHANGE | 8 ADD (CM1) |
| | CM2 | 9 NO CHANGE | 10 NO CHANGE OR CHANGE | 11 UPDATE (CM2) | 12 ADD (CM2) |
| FUNCTION IS NOT BEING EXECUTED | CM | 13 DELETE (DISTRIBUTE) | 14 NO CHANGE OR DELETE | 15 NO CHANGE OR DELETE | 16 — |
| | CM1 | 17 NO CHANGE | 18 DELETE | 19 NO CHANGE OR DELETE | 20 NO CHANGE |
| | CM2 | 21 NO CHANGE | 22 NO CHANGE OR DELETE | 23 DELETE | 24 NO CHANGE |

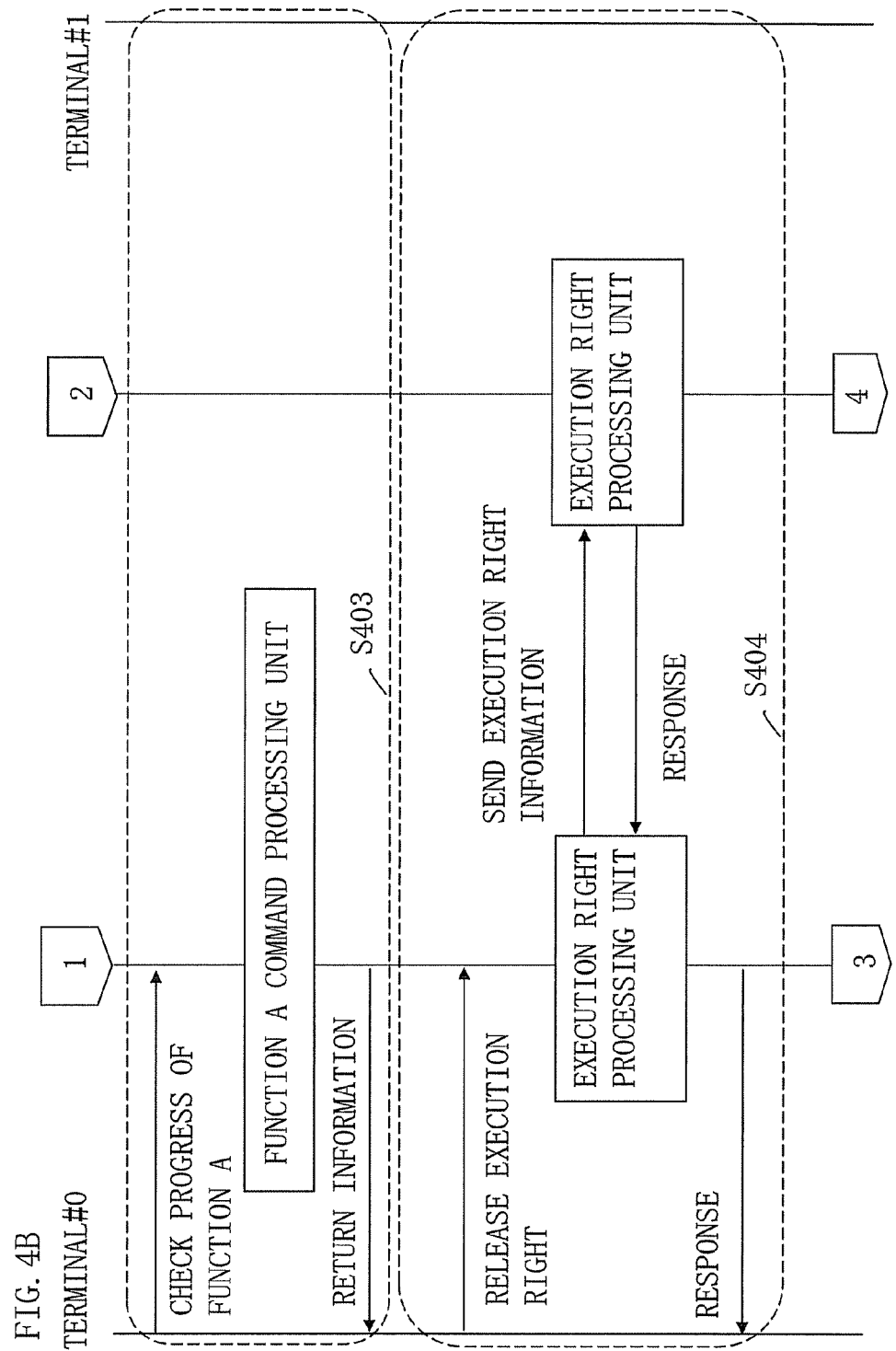

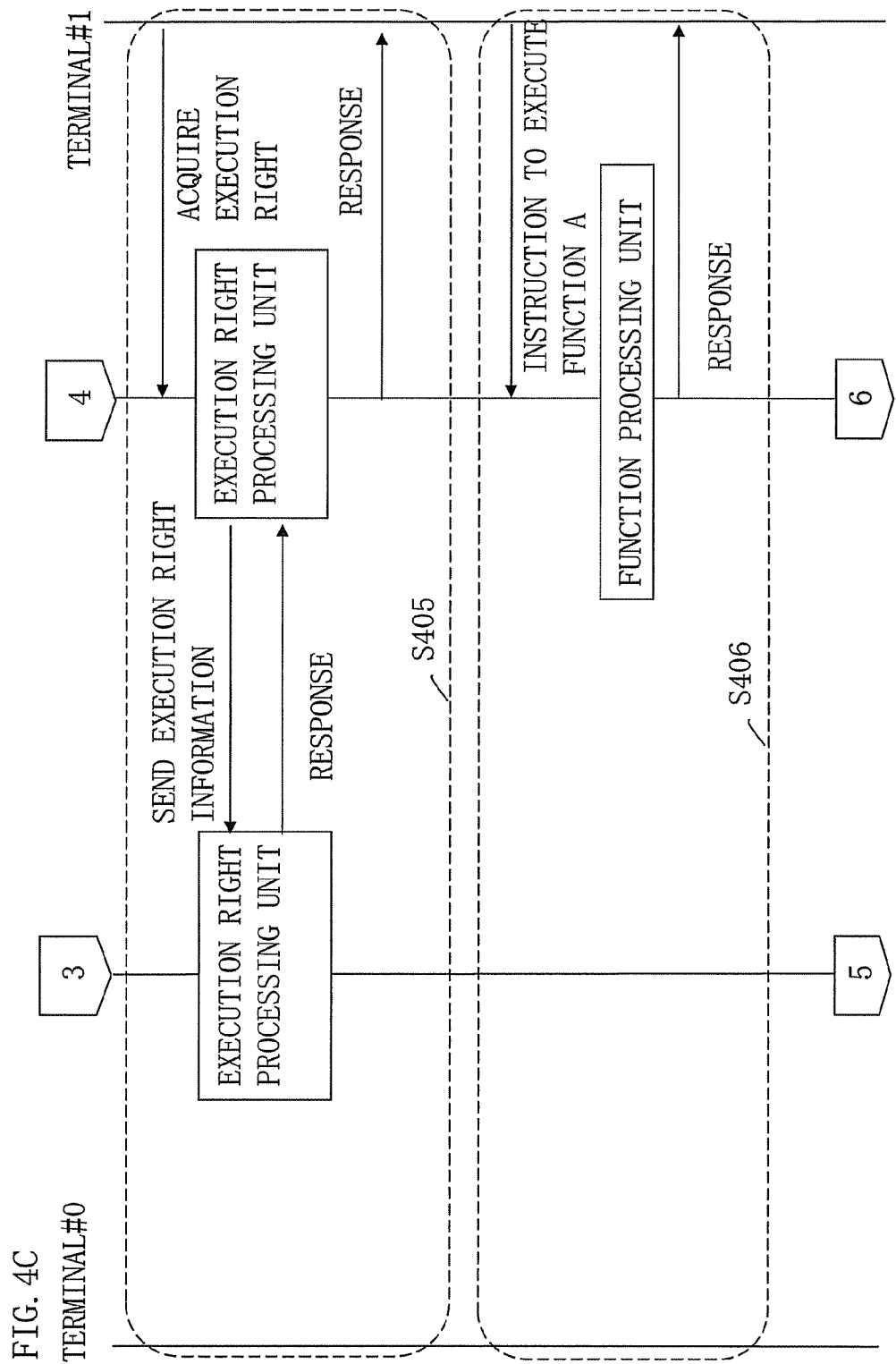

TERMINAL#0

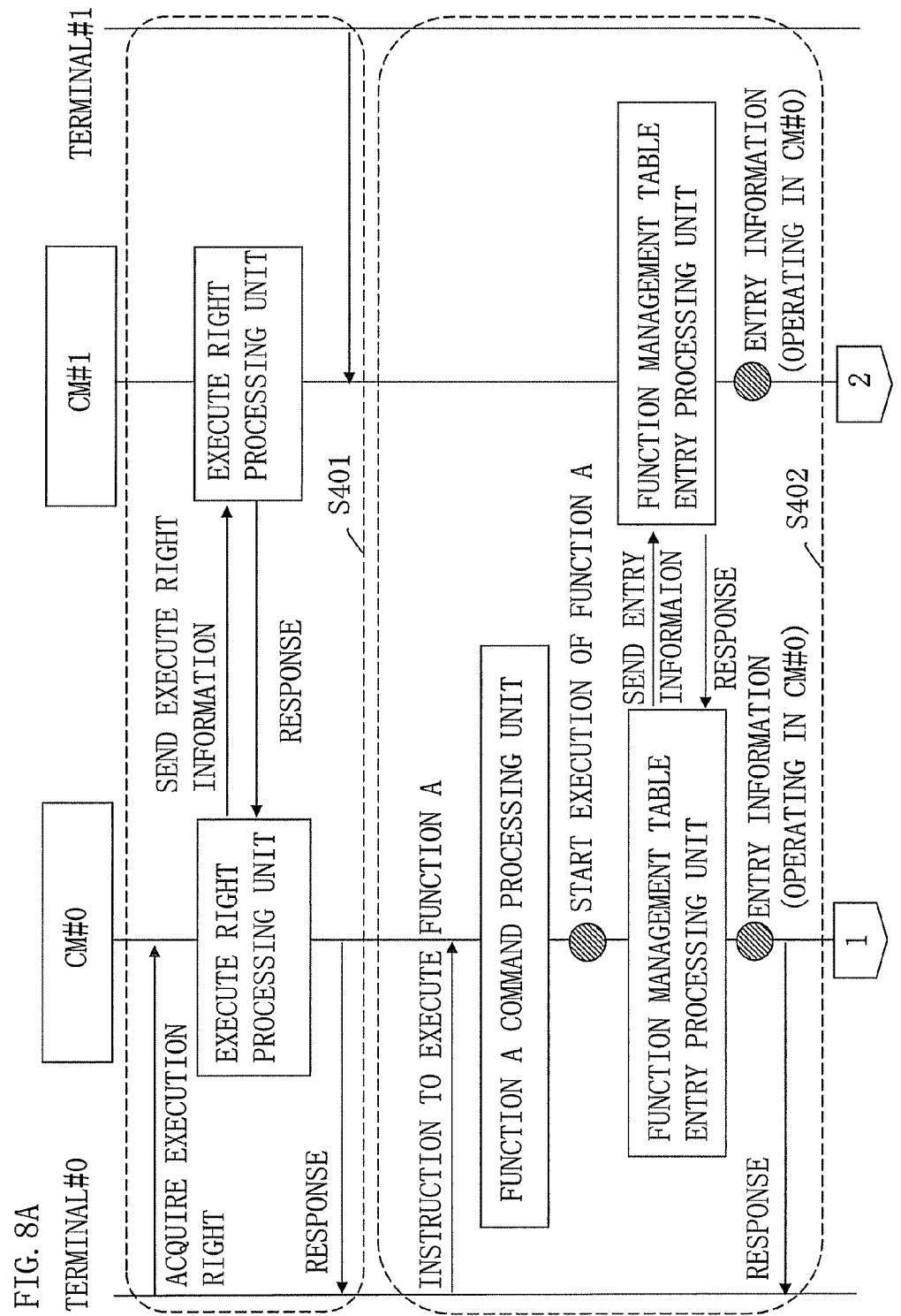

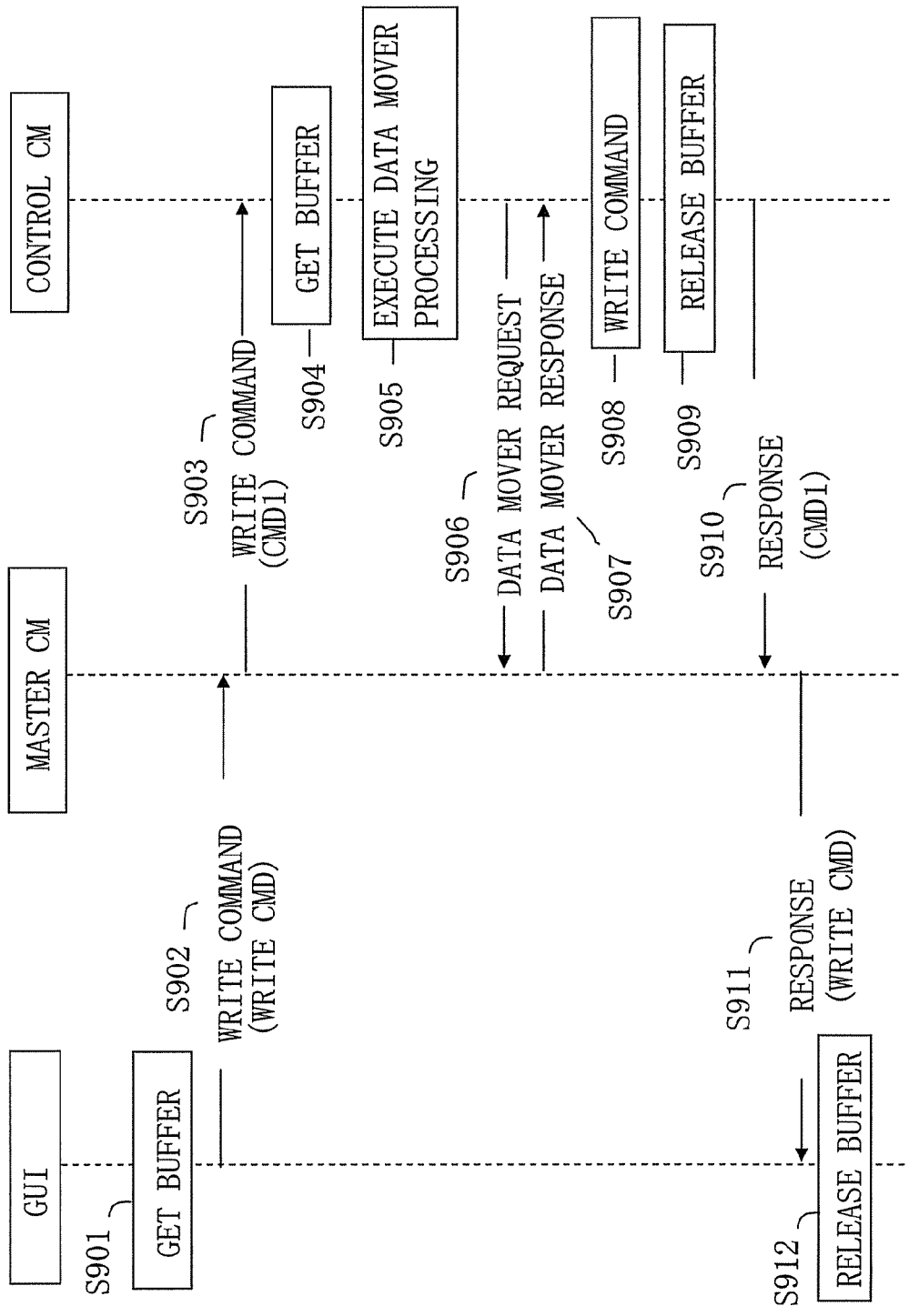

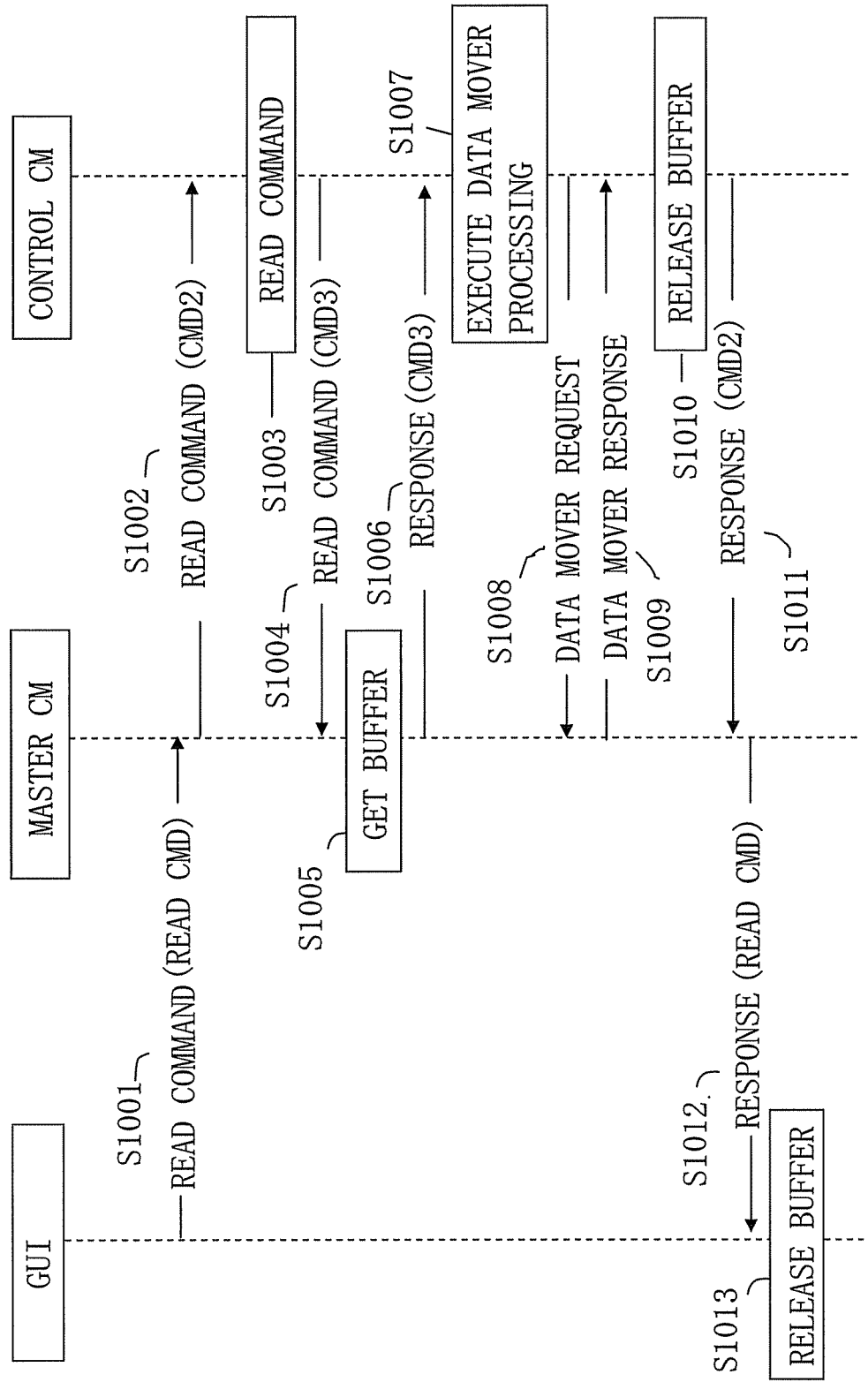

CONTROL UNIT FOR STORAGE APPARATUS AND METHOD FOR CONTROLLING STORAGE APPARATUS

CROSS-REFERENCE TO RELATED APPLICATIONS

This application is based upon and claims the benefit of priority of the prior Japanese Patent Application No. 2008-221458, filed on Aug. 29, 2008, the entire contents of which are incorporated herein by reference.

FIELD

The embodiment discussed herein is related to a technique for controlling synchronization among controller modules (hereinafter called CMs) that control operations of reading and writing data in individual storage medium modules of storage apparatus such as hard disk storage devices when the storage apparatus perform operations, cooperating with each other, for example, operations in a Redundant Arrays of Inexpensive Disks (RAID) configuration.

BACKGROUND

When a storage apparatus constitutes, for example, a RAID system, in each storage medium module that constitutes the storage apparatus, a role as a master/slave is assigned to a CM that controls read and write operations on the storage medium module according to a processing instruction given from the outside.

Commands (control of setting changes, state acquisition, and maintenance) from an upper-level tool, such as a graphical user interface (GUI) maintenance tool, operated by, for example, a user or a maintenance person are sent to and received from an operation terminal via a local area network (LAN) for the storage apparatus.

In this case, hitherto, a CM set as a slave (a slave CM) has not been permitted to perform the aforementioned command control, and only a CM set as a master (a master CM) has been permitted to perform the command control, so that the command control has been driven by the master CM. Since all the commands other than those that require post-processing when the master CM goes down during command execution have been controlled by the master CM, the slave CM has not been capable of determining the state of functional processing by the master CM.

The reasons why the control is driven by a master CM are as follows:

(1) In many cases, a GUI maintenance screen is provided via a World Wide Web (Web) browser. Except in the case of emergency where connection to a browser cannot be established, there is no great necessity for manual switching from a master CM to a slave CM;

(2) Automatic switching from a master CM to a slave CM is needed only when the master CM goes down or a LAN port breaks;

(3) When a master CM goes down during the processing of a maintenance command, in most cases, no problem occurs if a new master CM that is newly connected to a LAN executes the maintenance command;

(4) In general, only a master CM has been connected to a LAN port, and a slave CM has not been connected to a LAN port to be incapable of getting access; and (5) A plurality of users authorized to make settings have not needed to log in at the same time. For the aforementioned reasons, hitherto, implementation in which processing control is driven by a master CM has not caused a problem.

However, as the variety of types of connections to storage apparatus, including network connections, has been increased, a request to permit a plurality of users authorized to make settings to log in at the same time and permit a slave CM to issue maintenance commands has been made. Moreover, a request to permit simple manual switching of a master CM has been made.

In such cases, in a known storage apparatus, it is not assumed that a plurality of users log in a master CM and a slave CM at the same time to perform processing and switching of the master CM is performed during the processing. Thus, the following problems may occur:

(1) Since each of the CMs cannot determine which function another CM is executing, in processing triggered by a command from a GUI, continuous processing cannot be performed at all;

(2) When a slave CM or a new master CM designated after switching of a former master CM executes a command, the same processing may be performed in a storage apparatus in a duplicate manner, and thus the storage apparatus may malfunction; and (3) In a case where the guard of each command is enhanced, inquiries need to be sent to not only the CM but another CM, communicating with the other CM, and thus additional communications occur.

FIGS. 11A and 11B illustrate a case where a LAN is active (Active) only for a master CM in a known art. In normal condition, an operation terminal #0 and an operation terminal #1 can access a master CM, the master CM includes a function processing unit 201(#0) and a command control unit 202(#0), as illustrated in FIG. 11A (normal condition). However, in the known art, when a part of a network breaks, as illustrated in FIG. 11B (path anomalies), since, for example, a storage apparatus does not include a mechanism that changes a master CM upon detecting network anomalies or cannot detect network failures, the master CM cannot be changed. Thus, a problem exists in that both the operation terminals #0 and #1 cannot have access.

SUMMARY

According to an aspect of the invention, a control unit for a storage apparatus controls writing and reading of data stored in a storage medium. The control unit includes an execution instruction accepting unit that accepts an instruction for execution from a control terminal, a storage unit that stores content of the accepted instruction for execution, a stored content notification unit that notifies another control unit in the storage apparatus of the content stored in the storage unit, and a processing unit that executes processing on the basis of the instruction for execution. The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 illustrates a data structure diagram of a function management table;

FIG. 3 illustrates a control matrix chart illustrating an operational algorithm for a function management table operating unit to perform an inter-CM synchronization control operation using the function management table;

FIGS. 4A to 4D illustrate a diagram (1) illustrating an exemplary operational sequence in the embodiment;

FIGS. 8A to 8C illustrate a diagram illustrating another exemplary operational sequence to illustrate a function of avoiding duplicate execution;

FIG. 9 illustrates an operational sequence diagram of a cooperative write operation between a master CM and a control CM;

FIG. 10 illustrates an operational sequence diagram of a cooperative read operation between a master CM and a control CM.

DESCRIPTION OF EMBODIMENT

Preferred embodiments of the present invention will be explained with reference to accompanying drawings.

In an embodiment described below, each CM 101 retains a function management table in which entry information indicating which function is operating in which CM 101 for what period is registered and performs control, communicating entries in the function management table to another CM 101 for synchronization among the CMs 101.

Figure 1:
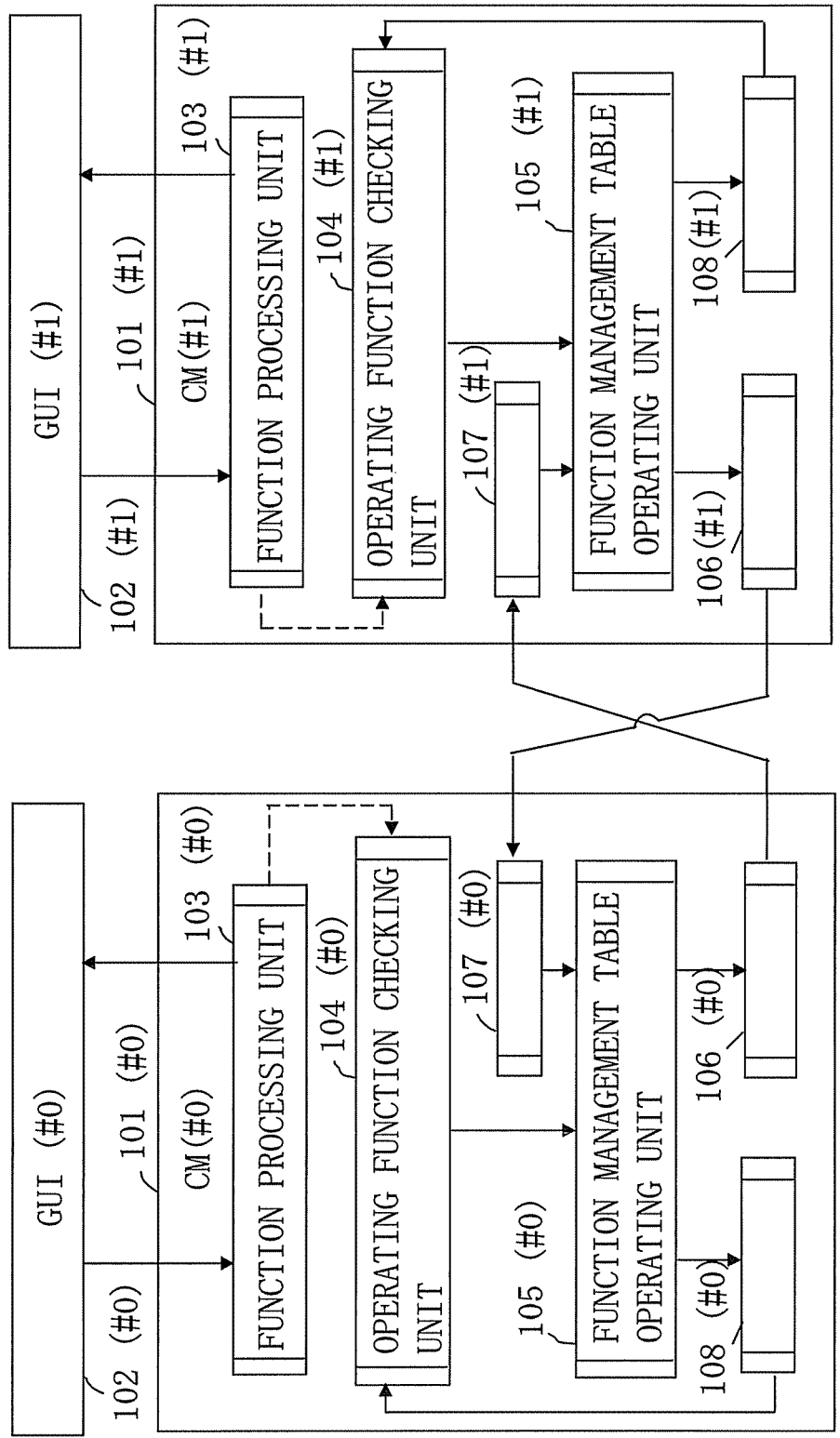
FIG. 1 illustrates a block diagram of an embodiment.

FIG. 1 is a block diagram of the embodiment. For each storage medium module that constitutes a storage apparatus, the CM 101 is provided as a basic component. The CM 101 can be accessed from a GUI screen 102 (hereinafter called the GUI 102) that operates in a terminal connected to the CM 101 via a network such as a LAN.

In the embodiment, the CM 101 is provided with a LAN port and configured so as to be accessed from the GUI 102. In FIG. 1, for the sake of simplifying the following description, only the CM 101 (#0) and the CM 101 (#1), which operate in conjunction with each other, are described, assuming that, in a normal operation, the CM 101 (#0) and the CM 101 (#1) operate as a master CM and a slave CM, respectively. Actually, a plurality of the CMs 101 cooperate with each other. In FIG. 1, the CM 101 (#0) is accessed from the GUI 102 (#0), and the CM 101 (#1) is accessed from the GUI 102 (#1).

The CM 101 includes a function processing unit 103, an operating function checking unit 104, a function management table operating unit 105, a function management table entry information distributing unit 106, a function management table entry information receiving unit 107, and a function management table watchdog timer unit 108.

The function processing unit 103 receives a command subjected to control (hereinafter called a target command) from the GUI 102, and performs processing corresponding to the target command. Thus the function processing unit 103 is an example of an accepting unit and an example of a processing unit. At this time, in a case where the function processing unit 103 in the CM 101 (#0) has received the target command, when read and write operations (operations related to setting changes, state acquisition, and maintenance) on a storage medium module other than that corresponding to the CM 101 (#0) are needed, the function processing unit 103 internally issues a control command for read and write operations to a target CM 101 (hereinafter called a control CM) so as to cause the control CM 101 to perform read and write operations on behalf of the CM 101 (#0), and necessary data transfer is performed between of the two CMs 101. This operation is described below in the description of FIGS. 9 and 10.

When the function processing unit 103 has returned a response indicating the start of the execution of the aforementioned target command to the GUI 102 upon starting the execution of the target command, the operating function checking unit 104 checks whether another function corresponding to the aforementioned target command is operating somewhere else in the CM 101.

Moreover, while any entry information is registered in a function management table retained by the CM 101, the function management table watchdog timer unit 108 causes a watchdog timer to operate. On the other hand, at predetermined intervals measured by the watchdog timer, the operating function checking unit 104 checks whether individual functions corresponding to individual pieces of entry information registered in the function management table are operating continuously in the CM 101.

The function management table entry information receiving unit 107 receives, from another CM 101, a request to add or update entry information in the function management table.

The function management table operating unit 105 performs control so that registered pieces of content in function management tables retained by the individual CMs 101 are always synchronized by adding, updating, changing, or deleting entry information in the function management table on the basis of the results of detection, by the operating function checking unit 104, of the execution states of the individual functions in the CM 101 and on the basis of the results of notification of the execution states of individual functions in the other CM 101 recognized on the basis of the request to add or update entry information received by the function management table entry information receiving unit 107. Thus the function management table operating unit 105 is an example of an instruction content updating unit.

Moreover, when the function management table operating unit 105 has added, updated, changed, or deleted pieces of entry information corresponding to the execution states of the individual functions in the CM in the function management table, so that pieces of content registered in the function management table have been changed, the function management table operating unit 105 distributes a request to add or update changed pieces of entry information to the other CM 101 via the function management table entry information distributing unit 106.

FIG. 2 is a data structure diagram of a function management table retained by the CM 101. The function management table is an example of a storage unit. In a function management table, an entry is registered for each function executed by the function processing unit 103 illustrated in FIG. 1. In an entry in a function management table, the respective values of the following fields are registered: "function value" that indicates an executing function, "control CM MID" that indicates the module identifier (ID) of the CM 101, in which the function is actually operating, "update time stamp" that indicates time when the entry was updated, and "number of times of update failure" that indicates the number of times updating of the entry failed.

In the "control CM MID" field, when a function indicated in the "function value" field registered in entry information that includes the "control CM MID" field is executed by a master CM that has received a target command corresponding to the function from the GUI 102, the ID of the master CM is registered; and when the function is executed by another control CM on the basis of an instruction from the master CM, the ID of the control CM is registered. In this case, the "control CM MID" field is used even for a case where a master CM is a control CM.

FIG. 3 is a control matrix chart illustrating an operational algorithm for the function management table operating unit 105 illustrated in FIG. 1 to perform an inter-CM synchronization control operation using the function management table having the data structure illustrated in FIG. 2.

In FIG. 3, classifications "function is being executed" and "function is not being executed" described in two rows indicated by "input" illustrate whether a function subjected to control (hereinafter called a target function) recognized by the function management table operating unit 105 via the operating function checking unit 104 or the function management table entry information receiving unit 107 is being executed or is not being executed. Each of the two classifications includes three classifications each of which indicates which CM 101 is a source from which the target function is input.

Moreover, classifications described in four columns indicated by "entry information in a function management table" illustrate whether entry information that includes a function value corresponding to the aforementioned target function is registered ("yes (Valid)") or is not registered ("no (InValid)") in the "function value" field (refer to FIG. 2) and illustrate, when the entry information is registered, which of the CMs 101 (in the case of FIG. 3, CM and CM 1 and CM 2) is registered in the "control CM MID" field in the entry information.

Classifications are described in cells 1 to 24 each of which is determined by one of the rows and one of the columns in FIG. 3. Each of the classifications indicates an operation to be performed on the function management table by the function management table operating unit 105.

The function management table operating unit 105 executes a control program that supports the control matrix in FIG. 3. The operations of the function management table operating unit 105 based on the control matrix in FIG. 3 will now be described.

First, in a case (hereinafter called a case 1) where the function processing unit 103 in FIG. 1 has received a target command from the GUI 102 and started the execution of the target command and then the operating function checking unit 104 has detected that a target function corresponding to the target command is being executed in the CM, when it is found, as a result of searching pieces of entry information in the function management table by the function management table operating unit 105, that no entry information corresponding to the target function exists, the function management table operating unit 105 adds entry information in which the ID of the CM is set in the "control CM MID" field, and a value corresponding to the target function is set in the "function value" field. In this case, the current time is set in the "update time stamp" field, and zero is set in the "number of times of update failure" field. Moreover, the function management table operating unit 105 distributes a request to add the entry information to the other CMs 101 via the function management table entry information distributing unit 106 (the aforementioned operation corresponds to that described in the cell 4 in FIG. 3). Thus the function management table operating unit 105 and the function management table entry information distributing unit 106 are an example of a stored content notification unit. In this state, the execution of the target function has been newly started in the CM.

When the operating function checking unit 104 determines, as a result (hereinafter called a case 2) of checking, at predetermined intervals measured by the watchdog timer of the function management table watchdog timer unit 108, whether individual functions corresponding to individual pieces of entry information registered in the function management table are operating continuously in the CM, that a function in the "function value" field in entry information that is extracted from the function management table and includes the ID of the CM in the "control CM MID" field is operating continuously in the CM, the function management table operating unit 105 updates the entry information by setting the current time in the "update time stamp" field and again setting zero in the "number of times of update failure" field in the entry information. Moreover, the function management table operating unit 105 distributes a request to update the entry information to the other CMs 101 via the function management table entry information distributing unit 106 (the aforementioned operation corresponds to that described in the cell 1 in FIG. 3). In this state, the CM continues executing the target function.

In the case 1, when entry information that corresponds to the aforementioned target function and includes the ID of the other CM (the other CM 1 or the other CM 2) in the "control CM MID" field is found as a result of searching pieces of entry information in the function management table by the function management table operating unit 105, the function management table operating unit 105 changes the entry information by setting the ID of the CM in the "control CM MID" field, setting the current time in the "update time stamp" field, and again setting zero in the "number of times of update failure" field in the entry information. Moreover, the function management table operating unit 105 distributes a request to change the entry information to the other CMs 101 via the function management table entry information distributing unit 106 (the aforementioned operation corresponds to that described in the cell 2 or 3 in FIG. 3). In this state, for example, the other CM, which executed the target function, has gone down, and the CM has started the execution of the target function on behalf of the other CM.

In a case (hereinafter called a case 3) where the function management table entry information receiving unit 107 has received a request to add or update entry information from the other CM (the other CM 1 or the other CM 2), and as a result, the function management table operating unit 105 has detected that a target function identified by the "function value" field in the entry information is being executed in the other CM, when it is found, as a result of searching pieces of entry information in the function management table by the function management table operating unit 105, that no entry information corresponding to the target function exists, the function management table operating unit 105 adds entry information in which the ID of the other CM (the other CM 1 or the other CM 2) is set in the "control CM MID" field, and a value corresponding to the target function is set in the "function value" field. In this case, the current time is set in the "update time stamp" field, and zero is set in the "number of times of update failure" field (the aforementioned operation corresponds to that described in the cell 8 or 12 in FIG. 3). In this state, the execution of the target function has been newly started in the other CM.

In the case 3, when entry information that corresponds to the aforementioned target function and includes the ID of the CM in the "control CM MID" field is found as a result of searching pieces of entry information in the function management table by the function management table operating unit 105, the function management table operating unit 105 does not change the entry information (the aforementioned operation corresponds to that described in the cell 5 or 9 in FIG. 3). In this control, even in a case where the execution of the target function has been started in the other CM, when the target function is being executed in the CM, this state is overriding.

In the case 3, when entry information that corresponds to the aforementioned target function and includes the ID of the other CM, which the same as the other CM corresponding to the aforementioned indicated target function, in the "control CM MID" field is found as a result of searching pieces of entry information in the function management table by the function management table operating unit 105, the function management table operating unit 105 updates the entry information by setting the current time in the "update time stamp" field and again setting zero in the "number of times of update failure" field in the entry information (the aforementioned operation corresponds to that described in the cell 6 or 11 in FIG. 3). In this processing, when the entry information corresponding to the function, which is continuously being executed, has been updated in the other CM by operation check performed in the other CM at the predetermined intervals by the aforementioned control operation in the cell 1 in FIG. 3, and the update information has been distributed to the CM, the entry information in the CM is synchronized with the entry information in the other CM regarding the update.

In this manner, normally, when the execution of a function continues in a control CM, a request to update entry information corresponding to the function is distributed to another CM at the predetermined intervals. Upon receiving this information, the other CM updates the value of the "update time stamp" field and resets the value of the "number of times of update failure" field to zero in corresponding entry information in the function management table in the other CM. On the other hand, the operating function checking unit 104 increments the value of the "number of times of update failure" field in a piece of entry information that includes, in the "control CM MID" field, an ID other than the ID of the CM, out of pieces of entry information registered in the function management table, at the predetermined intervals measured by the watchdog timer of the function management table watchdog timer unit 108. Thus, while the other CM operates normally, the value of the "number of times of update failure" field is not increased because the value is reset at the predetermined intervals. However, when the other CM malfunctions, the value of the "number of times of update failure" field is increased because the value is not reset. Thus, in the control operations in the cells 7, 10, 14, 15, 19, and 22 in FIG. 3 described below, the function management table operating unit 105 can detect anomalies in the other CM by determining the value of the "update time stamp" field and the value of the "number of times of update failure" field.

In this case, when the progress rate of a function is put in a corresponding piece of entry information in the function management table as additional information, upon detecting a state in which processing by the function does not proceed while the piece of entry information is periodically distributed, some kind of action can be taken, determining that a control CM malfunctions.

In the case 3, when entry information that corresponds to the aforementioned target function and includes the ID of the other CM, other than the other CM corresponding to the aforementioned indicated target function, in the "control CM MID" field is found as a result of searching pieces of entry information in the function management table by the function management table operating unit 105, the function management table operating unit 105 does not change the entry information. Alternatively, in the entry information, when time in the "update time stamp" field is at least a predetermined time period ahead of the current time and when a number in the "number of times of update failure" field is equal to or more than a predetermined number of times, the function management table operating unit 105 determines that the other CM corresponding to the entry information has gone down and has been switched to the other CM, which has been newly indicated. Thus, the function management table operating unit 105 changes the entry information by, in the entry information, setting the ID of the other CM corresponding to the aforementioned indicated target function in the "control CM MID" field, setting the current time in the "update time stamp" field, and again setting zero in the "number of times of update failure" field (the aforementioned operation corresponds to that described in the cell 7 or 10 in FIG. 3).

When the operating function checking unit 104 determines, as a result (hereinafter called a case 4) of checking, at the predetermined intervals measured by the watchdog timer, whether individual functions corresponding to individual pieces of entry information registered in the function management table are operating continuously in the CM, that a function in the "function value" field in entry information that is extracted from the function management table and includes the ID of the CM in the "control CM MID" field is no longer operating in the CM, the function management table operating unit 105 deletes the entry information from the function management table. Moreover, the function management table operating unit 105 distributes a request to delete the entry information to the other CMs 101 via the function management table entry information distributing unit 106 (the aforementioned operation corresponds to that described in the cell 13 in FIG. 3). In this state, the CM has completed the operation of the target function.

In the case 4, when the operating function checking unit 104 determines that a function in the "function value" field in entry information that is extracted from the function management table and includes the ID of the other CM (the other CM 1 or the other CM 2) in the "control CM MID" field is not operating in the CM, the function management table operating unit 105 does not change the entry information. Alternatively, in the entry information, when time in the "update time stamp" field is at least the predetermined time period ahead of the current time and when a number in the "number of times of update failure" field is equal to or more than the predetermined number of times, for example, the function management table operating unit 105 determines that the other CM corresponding to the entry information has gone down. Thus, the function management table operating unit 105 deletes the entry information from the function management table (the aforementioned operation corresponds to that described in the cell 14 or 15 in FIG. 3).

In a case (hereinafter called a case 5) where the function management table entry information receiving unit 107 has received a request to delete entry information from the other CM (the other CM 1 or the other CM 2), and as a result, the function management table operating unit 105 has detected that a target function identified by the "function value" field in the entry information is not being executed in the other CM (the other CM 1 or the other CM 2), when it is found, as a result of searching pieces of entry information in the function management table by the function management table operating unit 105, that no entry information corresponding to the target function exists, the function management table operating unit 105 does not change registered pieces of content in the function management table (the aforementioned operation corresponds to that described in the cell 20 or 24 in FIG. 3).

In the case 5, when entry information that corresponds to the aforementioned target function and includes the ID of the CM in the "control CM MID" field is found as a result of searching pieces of entry information in the function management table by the function management table operating unit 105, the function management table operating unit 105 does not change the entry information (the aforementioned operation corresponds to that described in the cell 17 or 21 in FIG. 3). In this control, even in a case where the execution of the target function has been completed in the other CM, when the target function is being executed in the CM, this state is overriding.

In the case 5, when entry information that corresponds to the aforementioned target function and includes the ID of the other CM, which the same as the other CM corresponding to the aforementioned indicated target function, in the "control CM MID" field is found as a result of searching pieces of entry information in the function management table by the function management table operating unit 105, the function management table operating unit 105 deletes the entry information from the function management table (the aforementioned operation corresponds to that described in the cell 18 or 23 in FIG. 3). In this processing, the entry information in the CM is synchronized with the entry information in the other CM regarding the deletion.

In the case 5, when entry information that corresponds to the aforementioned target function and includes the ID of the other CM, other than the other CM corresponding to the aforementioned indicated target function, in the "control CM MID" field is found as a result of searching pieces of entry information in the function management table by the function management table operating unit 105, the function management table operating unit 105 does not change the entry information. Alternatively, in the entry information, when time in the "update time stamp" field is at least the predetermined time period ahead of the current time and when a number in the "number of times of update failure" field is equal to or more than the predetermined number of times, the function management table operating unit 105 determines that the other CM corresponding to the entry information has gone down. Thus, the function management table operating unit 105 deletes the entry information from the function management table (the aforementioned operation corresponds to that described in the cell 19 or 22 in FIG. 3).

The detailed operations of the function management table operating unit 105 in FIG. 1 have been described on the basis of the control matrix in FIG. 3. The main operations are summarized below.

(Addition/Updating of Entry Information in a Function Management Table) The timings of addition and updating of entry information in a function management table are as follows. There is a case where, after the CM receives a specific command from a GUI, it is determined, as a result of checking functions operating in the CM, that a specific function is operating. There is a case where, when entry information exists in a function management table, it is determined, by periodically checking functions operating in the CM, that a specific function is operating. There is a case where a request to add or update entry information in a function management table in the CM has been received from another CM. There is a case where, while the module of the CM is restarted, that entry information is obtained from another CM. The control matrix in FIG. 3 does not include this case. The CM may independently obtain information on another CM.

(Deletion of Entry Information from a Function Management Table) The timings of deletion of entry information from a function management table are as follows. There is a case where, after the CM receives a specific command from a GUI, it is determined, as a result of checking functions operating in the CM, that a specific function is not operating. There is a case where, when entry information exists in a function management table in the CM, it is determined, as a result of periodically checking functions operating in the CM, that a specific function is not operating. There is a case where, when entry information received from another CM exists in a function management table in the CM, as a result of periodically checking the function management table, it is determined, on the basis of the value of the "update time stamp" field and the value of the "number of times of update failure" field in the entry information, that any request to update the entry information has not been received from a control CM for at least a predetermined time period and at least a predetermined number of times, or the control CM malfunctions. There is a case where a request to delete entry information from a function management table in the CM has been received from another CM.

FIGS. 4A to 4D illustrate a diagram (1) illustrating an exemplary operational sequence in the embodiment in FIG. 1. FIG. 5 illustrates a diagram (2) illustrating the exemplary operational sequence in the embodiment in FIG. 1. FIGS. 4A to 4D and 5 illustrate a case where the CM 101 (#0) (illustrated as the CM #0 in FIGS. 4A to 4D and FIG. 5) first executes the processing of a function A on the basis of an instruction from a terminal #0 (a terminal in which the GUI 102 (#0) in FIG. 1 operates), in the middle of the execution, maintenance control is switched from the terminal #0 to a terminal #1 (a terminal in which the GUI 102 (#1) in FIG. 1 operates), and then the CM 101 (#1) (illustrated as the CM #1 in FIGS. 4A to 4D and FIG. 5) executes the processing of the function A upon completion of the processing of the function A in the CM 101 (#0).

While such cooperative processing has been hitherto impossible, in the embodiment, a function can be executed from both the CM 101 (#0) and the CM 101 (#1), regardless of which of the CM 101 (#0) and the CM 101 (#1) is a master CM.

Figure 4A:
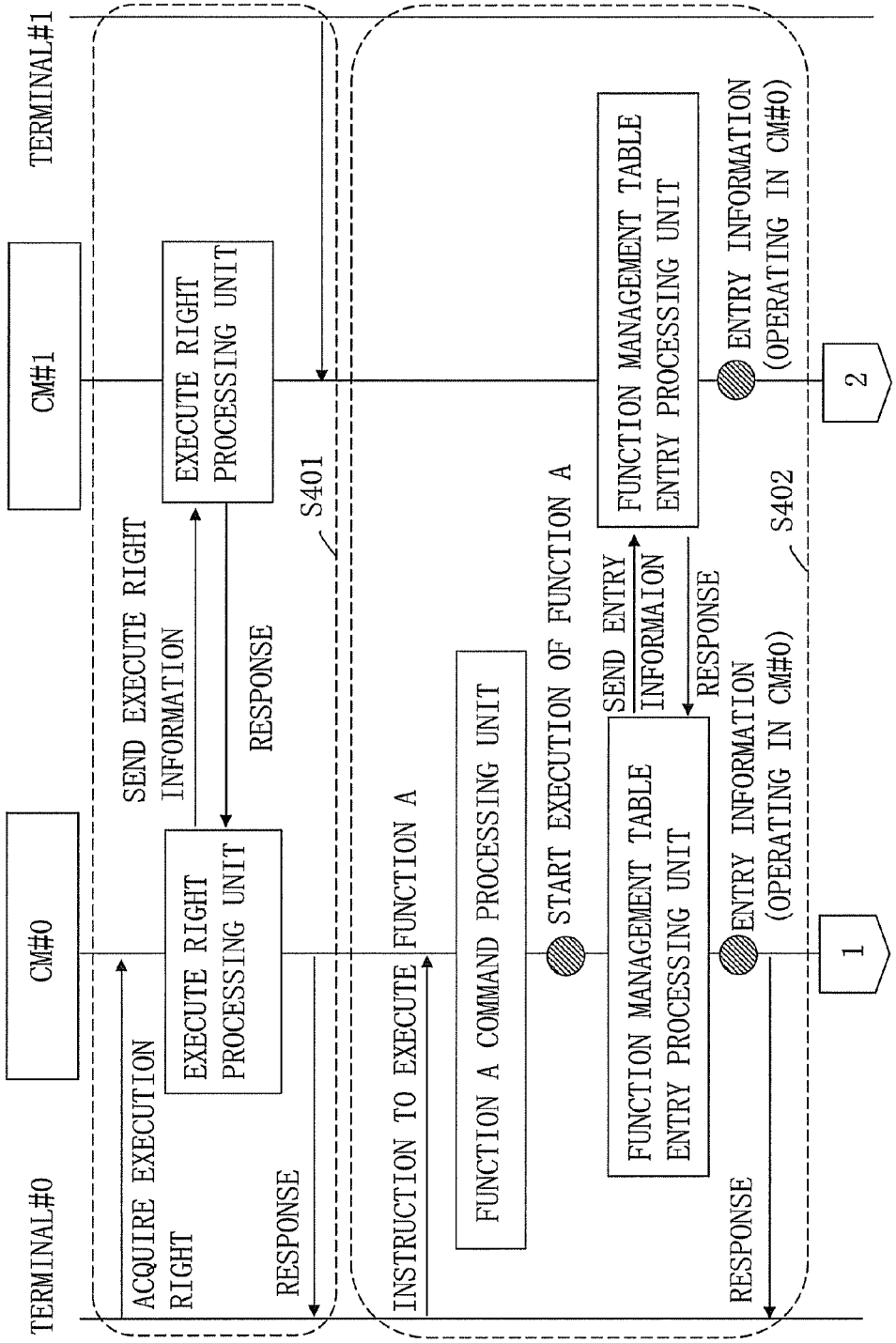
Figure 5:
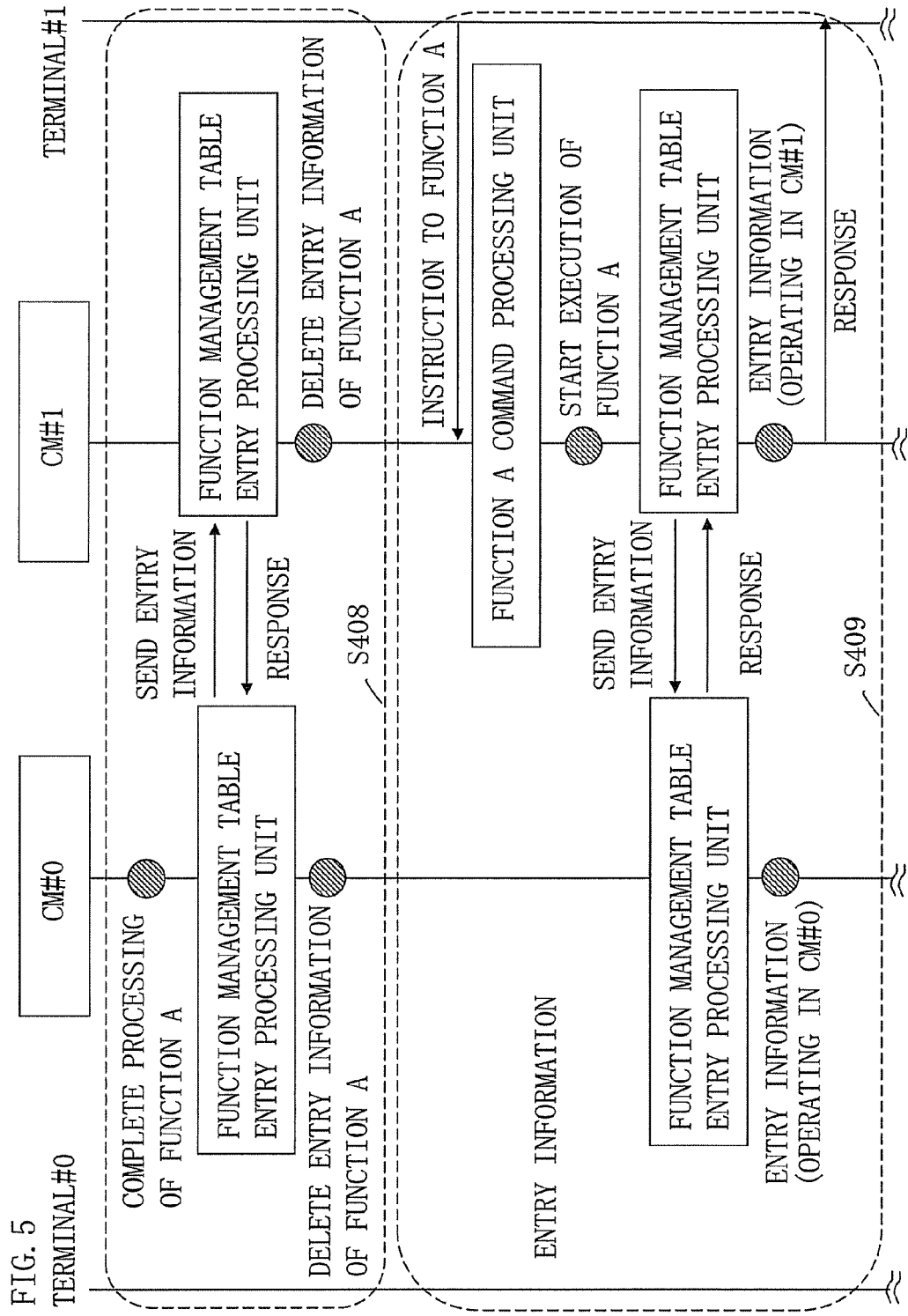
FIG. 5 illustrates a diagram (2) illustrating the exemplary operational sequence in the embodiment.

First, in a series of operations illustrated in step S401 in FIG. 4A, the CM #0 acquires an execution right on the basis of an instruction from the terminal #0, checking with the CM #1. In this case, it is assumed that the function A is processing that can be executed exclusively in only one of the CMs 101 at a time. Thus, the execution right needs to be acquired. In this case, an execution right processing unit is implemented via the function processing unit 103 in FIG. 1.

Then, in a series of operations illustrated in step S402 in FIG. 4A, the CM #0 starts the execution of the function A on the basis of an instruction to execute the function A from the terminal #0. At this time, the CM #0 and the CM #1 synchronize function management tables by the operations described with reference to FIGS. 1 to 3. In step S402, a function A command processing unit is implemented via the function processing unit 103 in FIG. 1, and a function management table entry processing unit is implemented via the components denoted by reference numerals 103 to 108 in FIG. 1. As a result, both the CM #0 and the CM #1 can determine where the function A is currently executed. That is, the entry information of the function A in a function management table of the CM #0 illustrates that the function A is operating in the CM #0, and the entry information of the function A in a function management table of the CM #1 illustrates that the function A is operating in another CM (the CM #0).

Then, in a series of operations illustrated in step S403 in FIG. 4B, on the basis of an instruction to check the progress of the function A from the terminal #0, the function A command processing unit in the CM #0 confirms the entry information of the function A in the function management table in the CM #0 and then returns information on the progress of the function A to the terminal #0.

Then, in a series of operations illustrated in step S404 in FIG. 4B, the terminal #0 releases the execution right regarding the processing of the function A, without waiting for the completion of the processing of the function A in the CM #0. Then, in a series of operations illustrated in step S405 in FIG. 4C, the terminal #1 acquires the execution right regarding the processing of the function A.

Then, in a series of operations illustrated in step S406 in FIG. 4C, the terminal #1 attempts to execute the processing of the function A in the CM #1. On the other hand, a function processing unit (denoted by reference numeral 103 in FIG. 1) in the CM #1 returns, to the terminal #1, a response indicating that the execution of the function A cannot be started in the CM #1 because the function A is still being executed in the CM #0 by checking the entry information of the function A in the function management table in the CM #1.

Figure 4D:
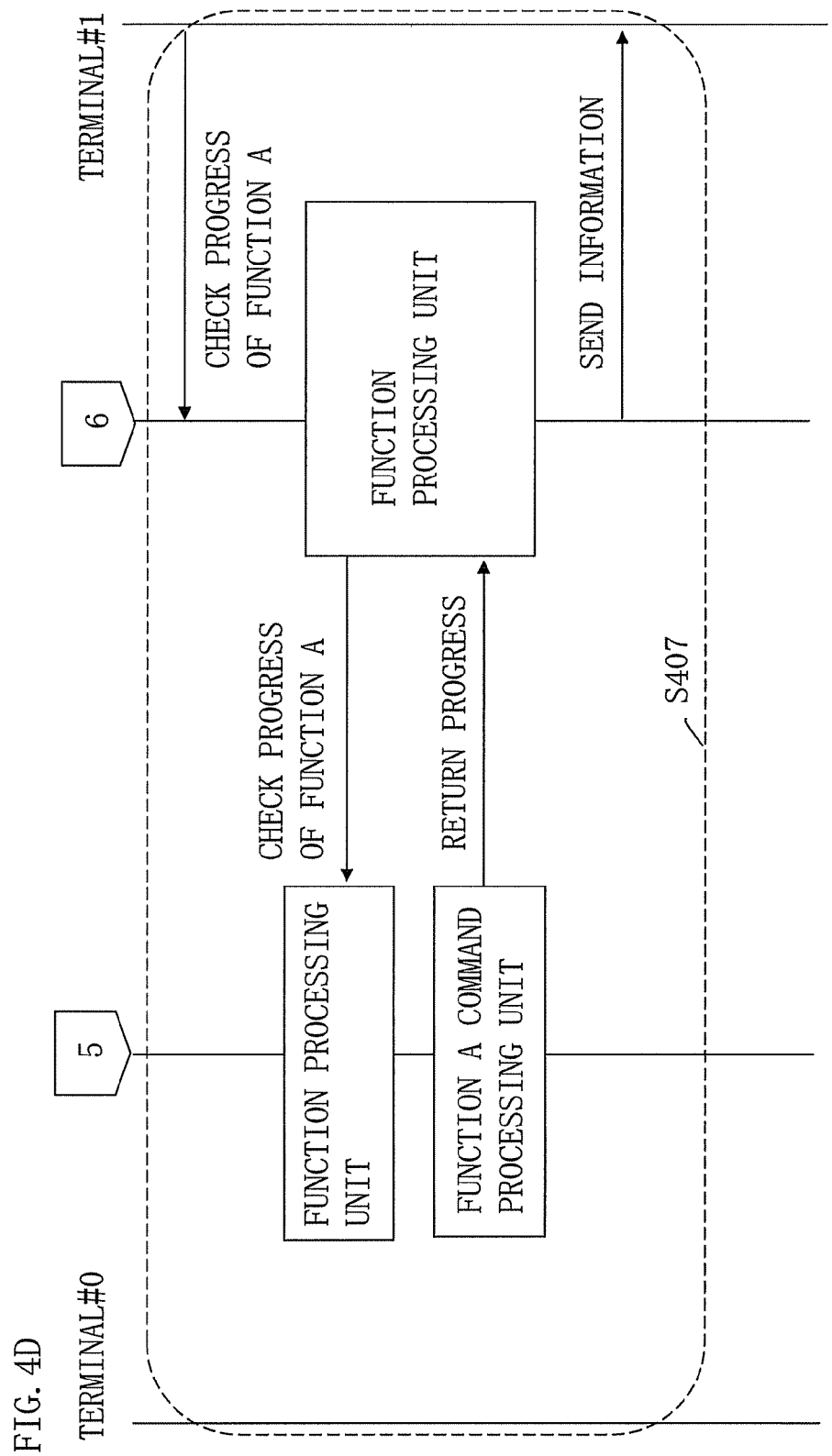

Then, in a series of operations illustrated in step S407 in FIG. 4D, on the basis of an instruction to check the progress of the function A from the terminal #1, the function processing unit in the CM #1 checks with a function processing unit in the CM #0 for the progress of the function A by checking the entry information indicating that the function A is being executed in the CM #0 in the function management table in the CM #1. As a result, the function A command processing unit in the CM #0 returns the progress of the function A to the function processing unit in the CM #1, and then the function processing unit in the CM #1 sends a notification of the progress of the function A to the terminal #1.

Then, in a series of operations illustrated in step S408 in FIG. 5, the processing of a function A command issued to the CM #0 from the terminal #0 is completed, and then the entry information of the function A is synchronously deleted from the function management tables in the CM #0 and the CM #1 by the operations described with reference to FIGS. 1 to 3.

Then, in a series of operations illustrated in step S409 in FIG. 5, the terminal #1 reissues an instruction to execute the function A in the CM #1, so that the CM #1 starts the execution of the function A. At this time, the CM #0 and the CM #1 synchronize the function management tables by the operations described with reference to FIGS. 1 to 3. As a result, the entry information of the function A in the function management table of the CM #1 illustrates that the function A is operating in the CM #1, and the entry information of the function A in the function management table of the CM #0 illustrates that the function A is operating in another CM (the CM #1), so that the function management tables of the CM #0 and the CM #1 are synchronized.

In this manner, in the embodiment, a plurality of the CMs 101 execute the processing of a function, synchronizing function management tables, so that the individual CMs can be controlled from GUIs in individual terminals, without inconsistency in processing between the CMs.

Figure 6A:
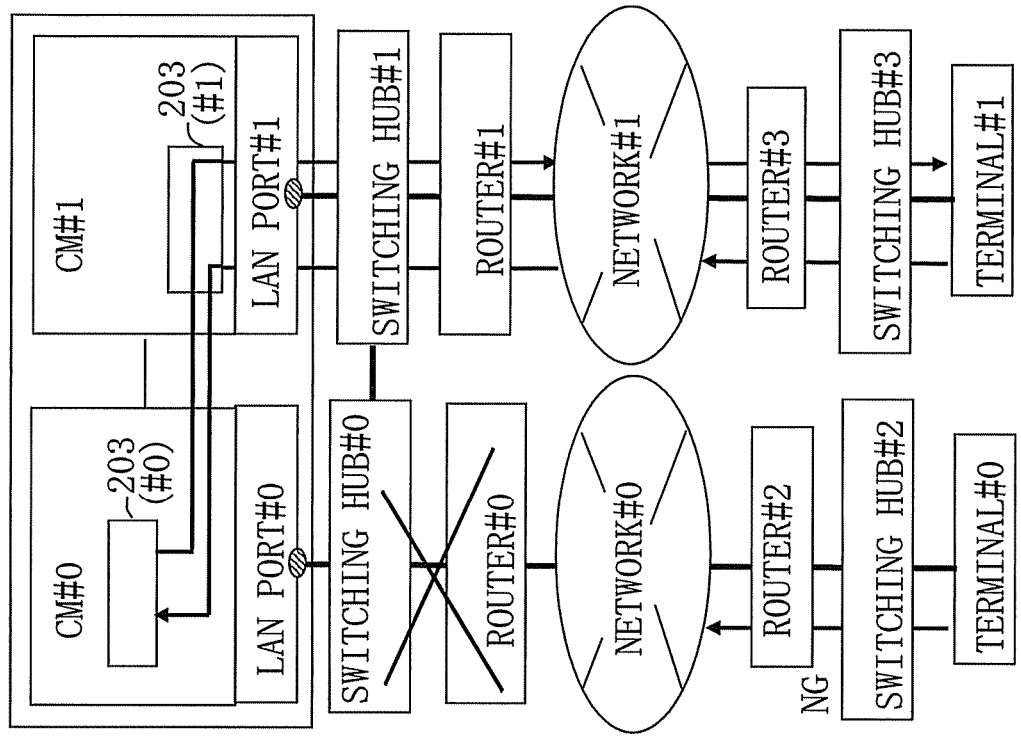
FIGS. 6A and 6B illustrate operations according to the embodiment in comparison with a known art.
Figure 6B:
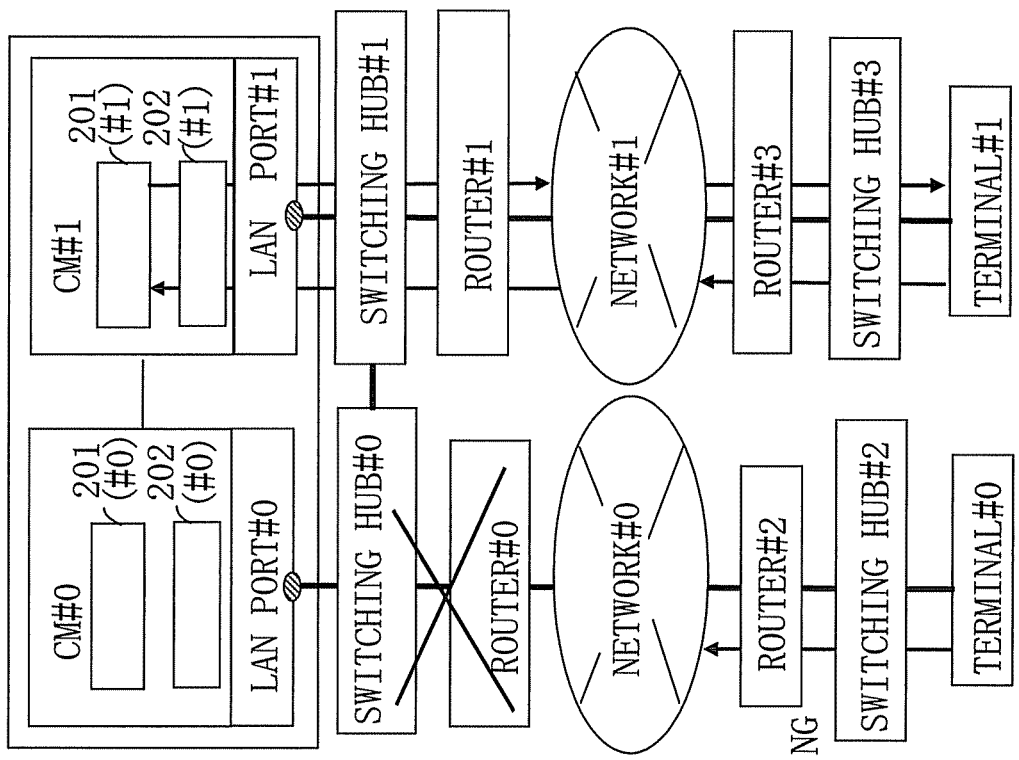
Figure 11B:
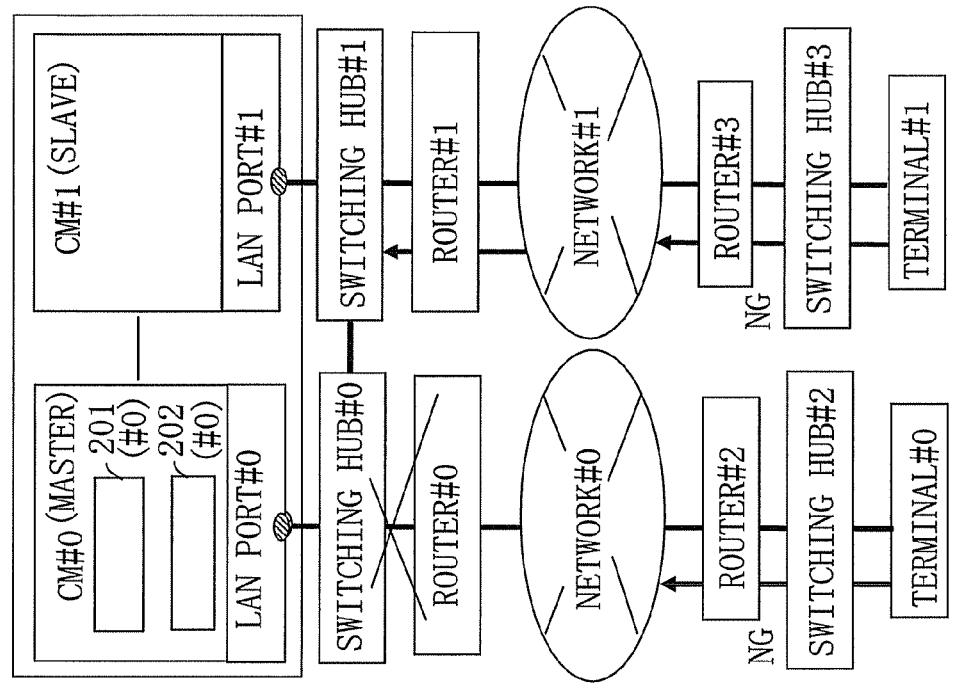
FIGS. 11A and 11B illustrate a diagram in the known art.
Figure 11A:
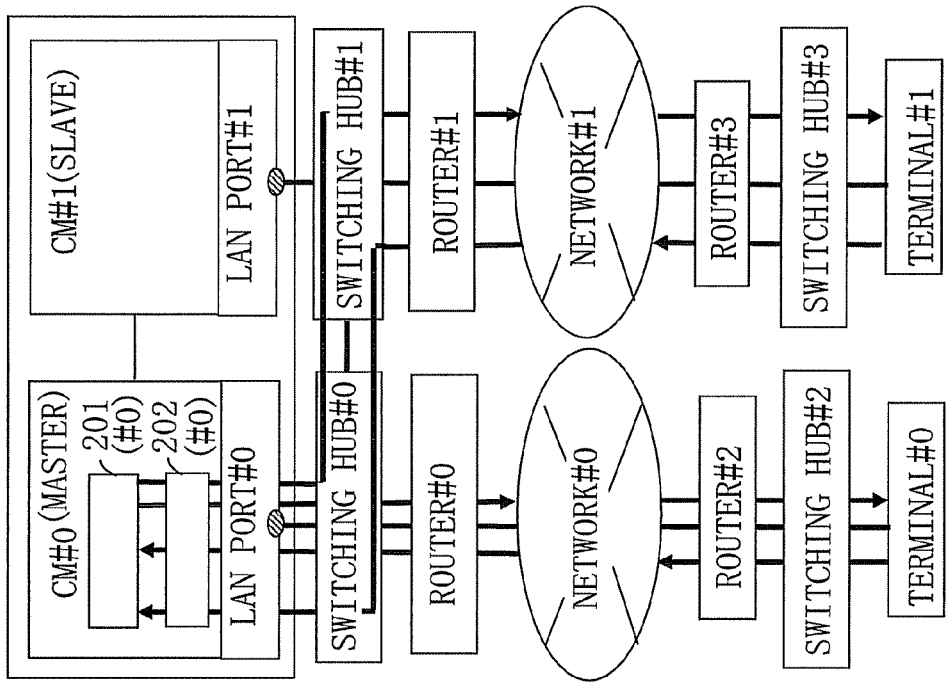

FIGS. 6A and 6B illustrate the operations according to the embodiment in comparison with the known art. As illustrated in the description of FIG. 11B (path anomalies), the known art has a problem in that, when a part of a network breaks, since a storage apparatus cannot change a master CM, both the operation terminals #0 and #1 cannot have access.

In contrast, a technique for making the respective LAN ports of both the CM #0 (a master) and the CM #1 (a slave) active (Active), as illustrated in FIG. 6A, may be considered as an improvement of the known art. As a result, as illustrated in FIG. 6A, the terminal #0 can access the CM #0 as the master, the master CM includes a function processing unit (#0) 201 and a command control unit (#0) 202. And the terminal #1 can access the CM #1 as the slave, the slave CM includes a function processing unit (#1) 203 and a command control unit (#1) 204. Moreover, an operation such that, in a normal condition, the CM #1 as the slave is caused to execute processing in a display system, and the CM #0 as the master is caused to execute processing in a setting system may be implemented by making the LAN active for both of the CMs.

However, in this arrangement, in a case where processing needs to be executed in an accessed CM, regardless of the CM #0 as the master or the CM #1 as the slave, a problem arises in exclusive control between the CMs. In the case illustrated in FIG. 6A, since no function management unit 203 exists, exclusive control between the CMs cannot be performed. In contrast, in the structure of the embodiment illustrated in FIG. 6B, a function management unit 203 implemented via the components denoted by reference numerals 103 to 108 in FIG. 1 enables, for example, transmission of a command to a control CM and determination to cause a function to be executed in the CM when an exclusive condition is satisfied. Moreover, not only in a case where the LAN is active for both of the CMs but in a case where the LAN is active only for the master CM, even when the master CM is changed in the middle of the execution of a certain function, the function management unit 203 illustrated in FIG. 6B is effective.

Figure 7A:
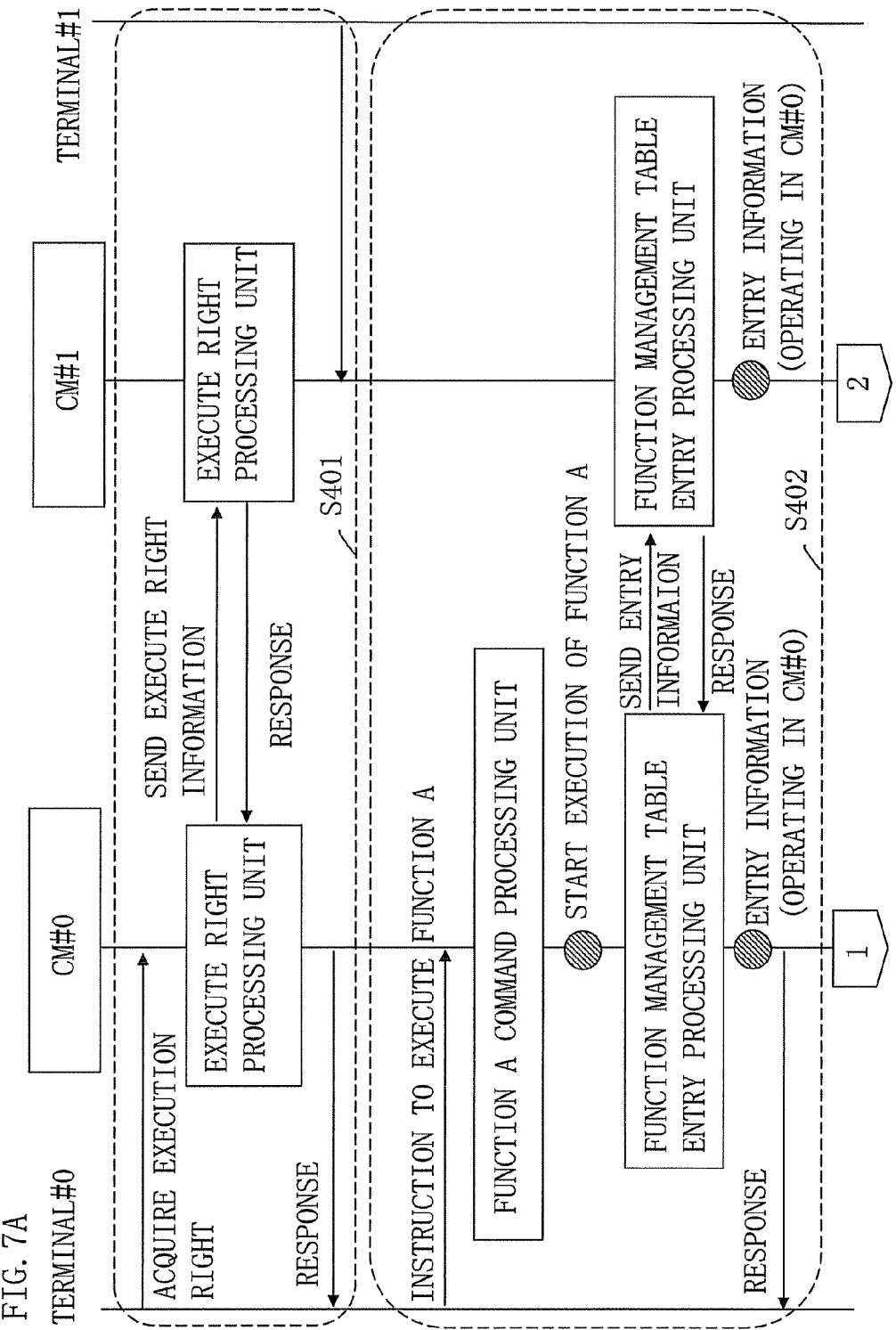
FIGS. 7A to 7C illustrate a diagram illustrating an exemplary operational sequence to illustrate a function of avoiding duplicate execution.
Figure 7B:
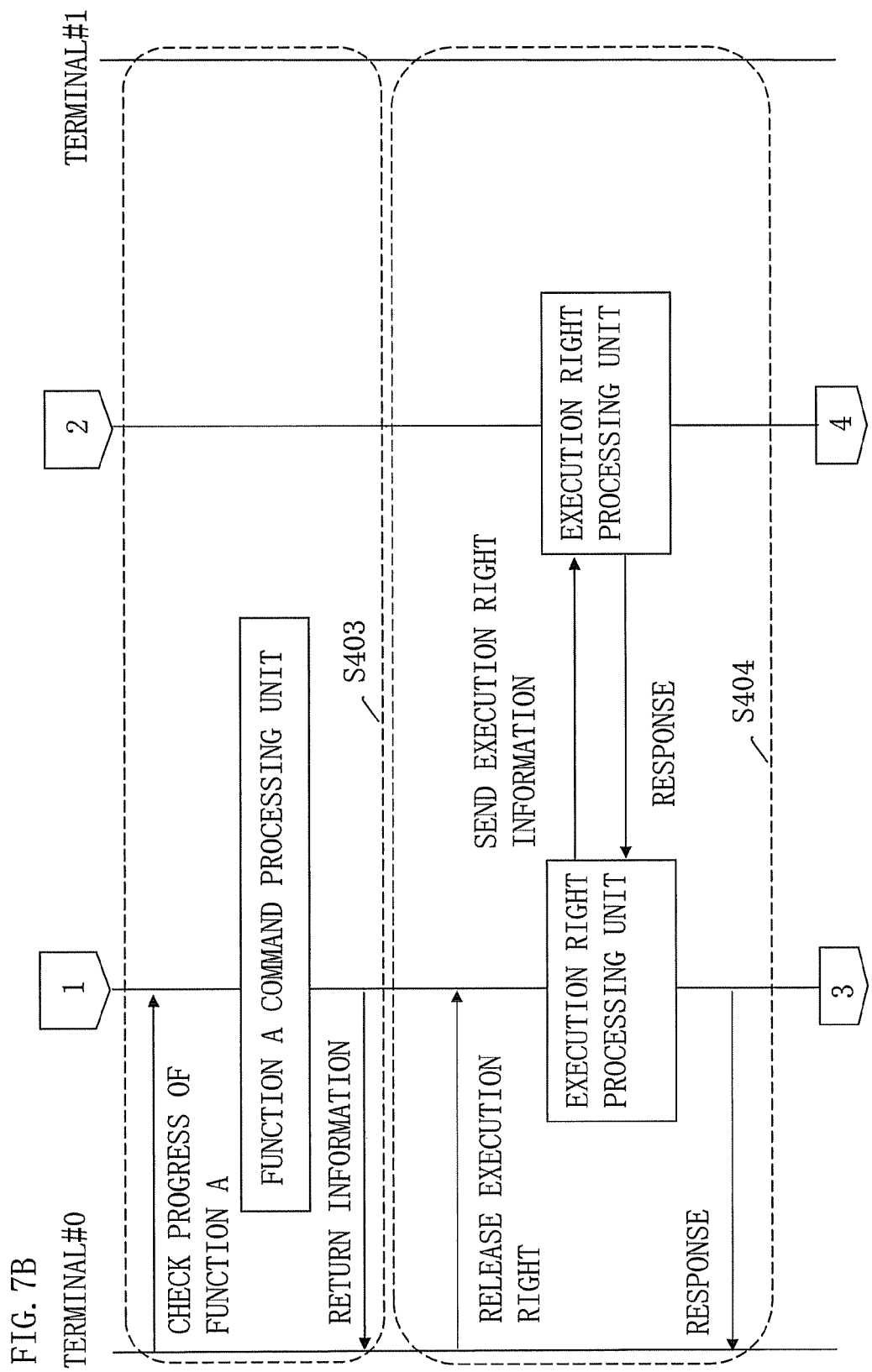
Figure 7C:
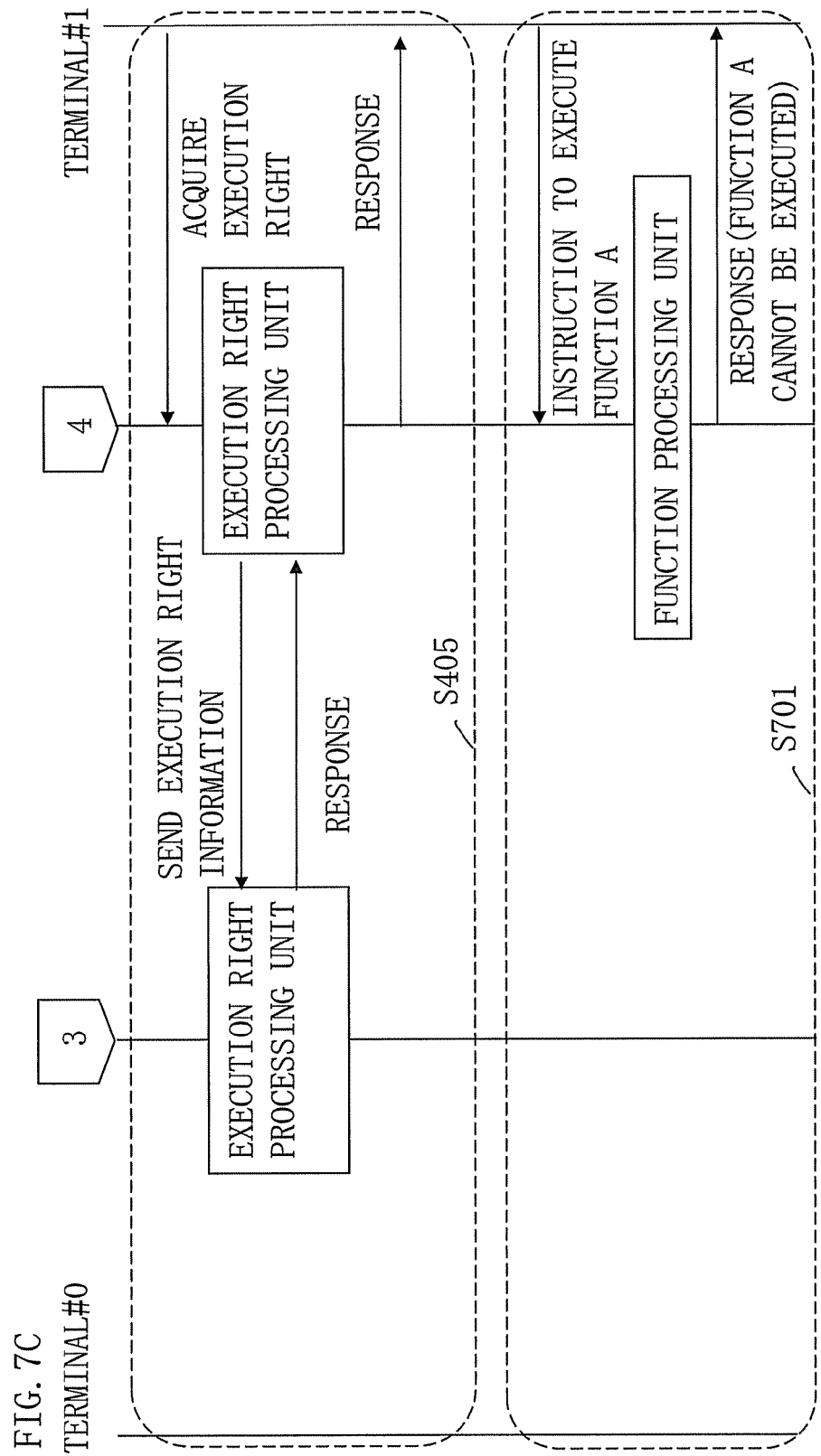

FIGS. 7A to 7C are a diagram illustrating an exemplary operational sequence to illustrate a function of avoiding duplicate execution in the exemplary operational sequence illustrated in FIGS. 4A to 4D. Basically, FIGS. 7A to 7C are the same as the FIGS. 4A to 4D. In a series of operations illustrated in step S701 in FIGS. 7A to 7C, the terminal #1 attempts to execute the processing of the function A in the CM #1, as also described in step S406 in FIG. 4C. On the other hand, the function processing unit (denoted by reference numeral 103 in FIG. 1) in the CM #1 can return, to the terminal #1, a response indicating that the function A cannot be executed in the CM #1 because the function A is still being executed in the CM #0 by checking the entry information of the function A in the function management table in the CM #1. This guard function is also effective for, e.g., exclusive control performed between functions in a case where a request to execute a function B arises in the middle of the execution of the function A.

Figure 8B:
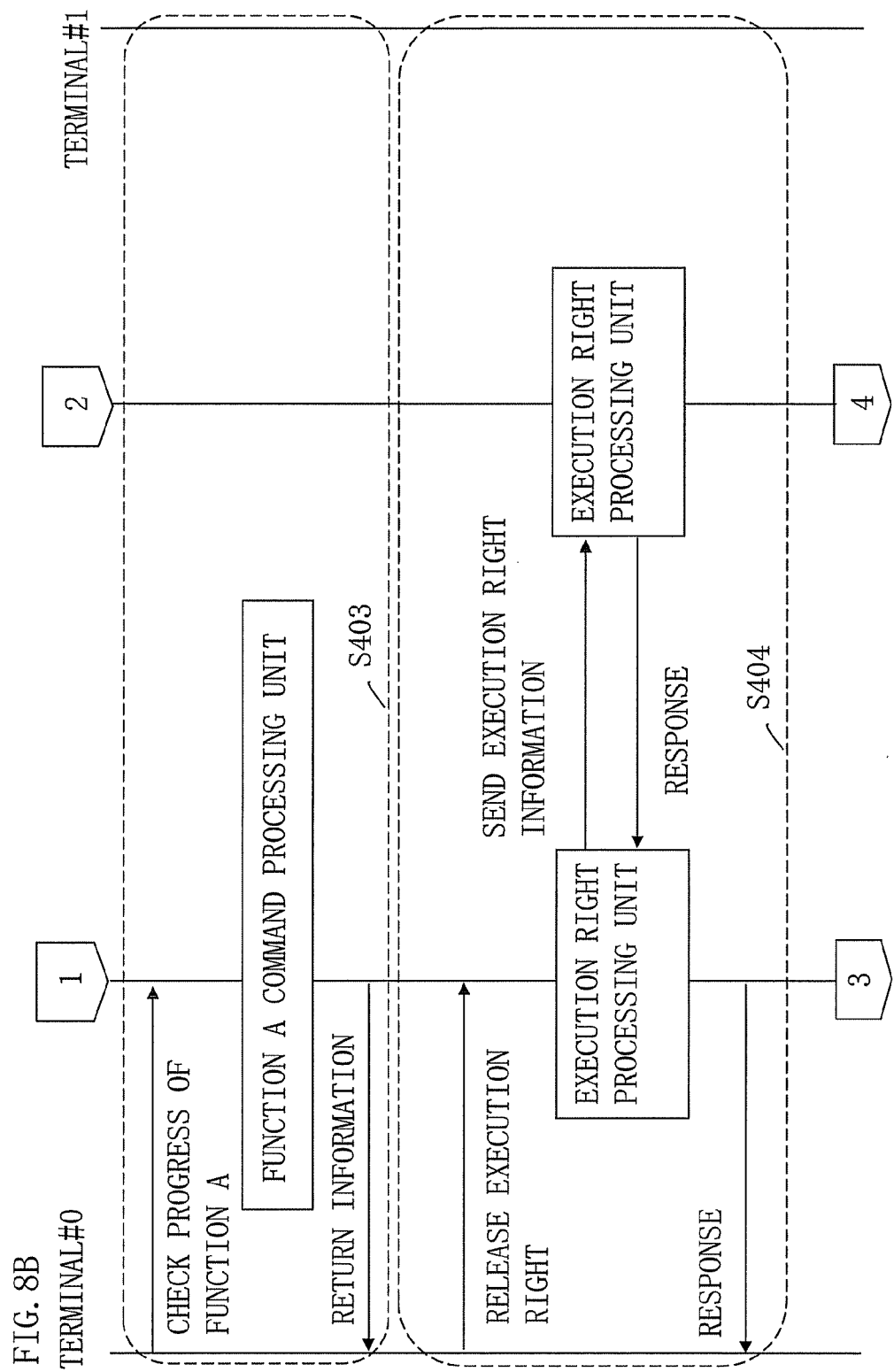
Figure 8C:
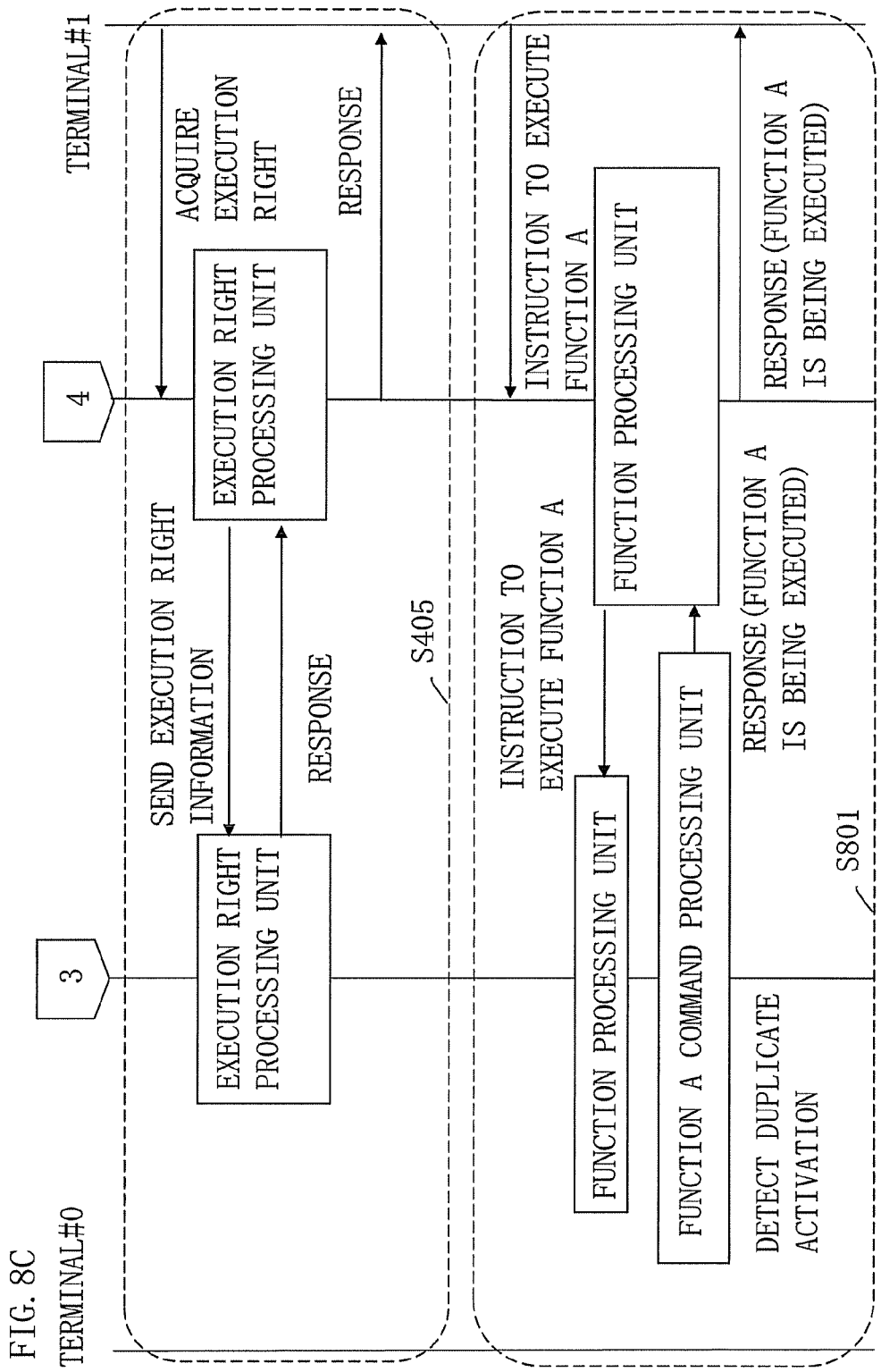

FIGS. 8A to 8C are a diagram illustrating another exemplary operational sequence to illustrate a function of avoiding duplicate execution in the exemplary operational sequence illustrated in FIGS. 4A to 4D. In a series of operations illustrated in step S801 (corresponding to step S406 in FIG. 4C) in FIG. 8C, the terminal #1 attempts to execute the processing of the function A in the CM #1. On the other hand, the function processing unit in the CM #1 sends an instruction to execute the function A to the function processing unit in the CM #0 by checking entry information indicating that the function A is being executed in the CM #0 in the function management table in the CM #1. As a result, the function processing unit in the CM #0 issues a pseudo execution command of the function A. Then, the function A command processing unit in the CM #0 detects duplicate activation of the function A and returns, to the function processing unit in the CM #1, a response indicating that the function A is being executed. Then, the function processing unit in the CM #1 returns, to the terminal #1, a response indicating that the function A is being executed.

FIG. 9 is an operational sequence diagram illustrating a typical cooperative operation in a case where, in response to a write command (a command related to, for example, setting changes and maintenance in which a CM receives data upon a request from a GUI) issued to a master CM from a GUI, the function processing unit 103 (refer to FIG. 1) in the CM 101 serving as the master CM performs a write operation, cooperating with the function processing unit 103 in the CM 101 serving as a control CM. FIG. 10 is an operational sequence diagram illustrating a typical cooperative operation in a case where, in response to a read command (a command related to, for example, state acquisition and maintenance in which a CM sends data when returning a response to a GUI) issued to a master CM from a GUI, the function processing unit 103 in the master CM performs a read operation, cooperating with the function processing unit 103 in a control CM.

In the following description, for the sake of simplifying the description, a master CM means the function processing unit 103 in the CM 101 serving as a master CM, and a control CM means the function processing unit 103 in the CM 101 serving as a control CM.

Operations in a case where, in response to a write command issued to the master CM from the GUI, the master CM performs a write operation, cooperating with the control CM, will first be described with reference to the operational sequence diagram in FIG. 9.

In step S901, the GUI gets a buffer for write data in the master CM. Then, in step S902, the GUI issues a write command (WriteCmd) to the master CM.

When the master CM has recognized that the write command has been issued for a storage medium controlled by the control CM, in step S903, the master CM issues a write command (Dedicated Cmd1) that is an internal command to the control CM.

When the control CM has received the internal write command, in step S904, the control CM first gets a buffer for write data in the control CM. Then, in step S905, the control CM executes data mover processing in which write data is transferred. As a result, in step S906, the control CM issues a data mover request (a Get request) to the master CM. In response to the data mover request, write data is copied from the buffer in the master CM to the buffer in the control CM. After the copying operation is completed, in step S907, the master CM returns a data mover response to the control CM.

After the transfer of the write data is completed, in step S908, the control CM issues a write command (WriteCmd) that is a pseudo command for the control CM to write the transferred write data to the storage medium. After the write operation is completed, in step S909, the control CM releases the buffer in the control CM.

Then, in step S910, the control CM returns, to the master CM, a response in response to the write command (Dedicated Cmd1), which is an internal command. Then, in step S911, the master CM having received the response returns, to the GUI, a response in response to the initial write command (WriteCmd). Finally, in step S912, the GUI having received the response releases the buffer in the master CM.

Operations in a case where, in response to a read command issued to the master CM from the GUI, the master CM performs a read operation, cooperating with the control CM, will next be described with reference to the operational sequence diagram in FIG. 10.

In step S1001, the GUI issues a read command (ReadCmd) to the master CM. When the master CM has recognized that the read command has been issued for the storage medium controlled by the control CM, in step S1002, the master CM issues a read command (Dedicated Cmd2) that is an internal command to the control CM.

When the control CM has received the internal read command, in step S1003, the control CM first issues a read command (ReadCmd) that is a pseudo command for the control CM to get a buffer in the control CM and read requested data into the buffer.

Then, in step S1004, the control CM issues a read command (Dedicated Cmd3) that is an internal command to the master CM. When the master CM has received the read command, the master CM gets a buffer for receiving read data in the master CM in step S1005 and returns, to the control CM, a response in response to the read command in step S1006.

When the control CM has received the response, in step S1007, the control CM first executes data mover processing in which read data is transferred. As a result, in step S1008, the control CM issues a data mover request (a Put request) to the master CM. In response to the data mover request, read data is copied from the buffer in the control CM to the buffer in the master CM. After the copying operation is completed, in step S1009, the master CM returns a data mover response to the control CM.

When the control CM has received the data mover response upon the completion of the transfer of the read data, in step S1010, the control CM releases the buffer in the control CM. Then, in step S1011, the control CM returns, to the master CM, a response in response to the read command (Dedicated Cmd2), which is an internal command. Then, in step S1012, the master CM having received the response returns, to the GUI, a response in response to the initial read command (ReadCmd). Finally, after reading the data from the buffer in the master CM, in step S1013, the GUI releases the buffer.

Regardless of which of a plurality of CMs in a storage apparatus is a master CM, processing can be executed in each of the CMs. A plurality of the CMs perform processing, synchronizing the function management tables, so that each of the terminals can control each of the CMs without inconsistency in the processing between the CMs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A control unit for a storage apparatus, the storage apparatus including a plurality of control units, the control unit comprising:
   a storage unit to store a management table to register entry information having information indicating a function of a command being executed by one of the control units in the storage apparatus related with identification information of the one of the control units that is executing the command;
   an accepting unit to accept a command from a control terminal;
   a receiving unit to receive from another control unit a request to add entry information having information indicating a function of a command being executed by the other control unit in the storage apparatus to the management table;
   an operating unit to register entry information corresponding to the accepted command on the management table when information indicating a function of the accepted command is not registered on the management table, and to register the received entry information on the management table when the request to add the entry information to the management table is received from the other control unit;

a processor to return to the control terminal a response indicating that the accepted command is not executed when information indicating the function of the accepted command is registered on the management table, and to execute the accepted command when the function of the accepted command is not registered on the management table; and a notification unit to notify the other control unit in the storage apparatus of the entry information corresponding to the accepted command registered on the management table, and wherein when a failure of processing of the accepted command occurs in the control unit, the processing is executed by the other control unit and the control unit is notified of execution of the processing by the other control unit through entry information synchronized between the control units, and wherein the entry information is updated after completion of the processing and shared between the control units.

2. The control unit according to claim 1, wherein the storage unit stores an update time of the entry information, and an update state of the entry information.

3. The control unit according to claim 2, comprising a checking unit that periodically checks the processing, which is being executed in the control unit, and updates the update time and the update state of the entry information stored in the storage unit based on an execution state of the processing.

4. The control unit according to claim 3, wherein the operating unit deletes the received entry information when the request to update the entry information is not received from the other control unit for a predetermined time period and a predetermined number of times, deletes the received entry information when a request to delete the received entry information is received from the other control unit, and deletes the entry information corresponding to the accepted command when the checking unit determines that the accepted command is completed.

5. The control unit according to claim 1, wherein, when the notification unit recognizes activation of the other control unit, the notification unit notifies the other control unit of the entry information stored in the storage unit.

6. A non-transitory storage apparatus to control writing and reading of data, the storage apparatus comprising:

a plurality of the control units each including:

a storage nit to store a management table to register entry information having information indicating a function of a command being executed by one of the control units in the storage apparatus related with identification information of the one of the control units that is executing the command, an accepting unit to accept a command from a control terminal, a receiving unit to receive from another control unit a request to add entry information having information indicating a function of a command being executed by the other control unit in the storage apparatus to the management table, an operating unit to register entry information corresponding to the accepted command on the management table when information indicating a function of the accepted command is not registered on the management table, and to register the received entry information on the management table when the request to add the entry information to the management table is received from the other control unit, a processing unit to return to the control terminal a response indicating that the accepted command is not executed when the information indicating the function of the accepted command is registered on the management table, and to execute the accepted command when the information indicating the function of the accepted command is not registered on the management table, and a notification unit to notify the other control unit in the storage apparatus of the entry information corresponding to the accepted command registered on the management table, wherein when a failure of processing of the accepted command occurs in the control unit, the processing is executed by the other control unit and the control unit is notified of execution of the processing by the other control unit through entry information synchronized between the control units, and wherein the entry information is updated after completion of the processing and shared between a plurality of control units.

7. The storage apparatus according to claim 6, wherein the storage unit stores an update time of the entry information, and an update state of the entry information.

8. The storage apparatus according to claim 7, comprising a checking unit that periodically checks the processing, which is being executed in the first control unit, and updates the update time and the update state of the entry information stored in the storage unit based on an execution state of the processing, and wherein when the receiving unit periodically receives a request to update the received entry information from the other control unit, and the operating unit updates the update time and update state of the received entry information.

9. The storage apparatus according to claim 8, wherein the operating unit deletes the received entry information when the request to update the entry information is not received from the other control unit for a predetermined time period and a predetermined number of times, deletes the received entry information when a request to delete the received entry information is received from the other control unit, and deletes the entry information corresponding to the accepted command when the checking unit determines that the accepted command is completed.

10. The storage apparatus according to claim 6, wherein, when activation of the other control unit is recognized, the notification unit notifies the other control unit, which has been activated, of the entry information stored in the storage unit.

11. A method to control a storage apparatus including a plurality of control units, the storage apparatus controlling writing and reading of data, the method comprising:

storing, in a storage unit, a management table to register entry information having information indicating a function of a command being executed by one of the control units in the storage apparatus related with identification information of the one of the control units that is executing the command;

accepting an instruction for execution from a control terminal;

receiving from another control unit a request to add entry information having information indicating a function of a command being executed by the other control unit in the storage apparatus to the management table;

registering entry information corresponding to the accepted command on the management table when information indicating a function of the accepted command is not registered on the management table;

registering the received entry information on the management table when the request to add the entry information to the management table is received from the other control unit;

returning to the control terminal a response indicating that the accepted command is not executed when the information indicating the function of the accepted command is registered on the management table;

executing the accepted command when the information indicating the function of the accepted command is not registered on the management table;

notifying the other control unit in the storage apparatus of the entry information corresponding to the accepted command registered on the management table, and wherein when a failure of processing of the accepted command occurs in the control unit, the processing is executed by the other control unit and the control unit is notified of execution of the processing by the other control unit through entry information synchronized between the control units, and wherein the entry information is updated after completion of the processing and shared between the control units.

12. The method according to claim 11, wherein an update time of the entry information, and an update state of the entry information are stored in the storage unit.

13. The method according to claim 12, comprising periodically checking the processing, which is being executed in a control unit, and updating the update time and the update state of the entry information stored in the storage unit based on an execution state of the processing, wherein when a request to update the received entry information is periodically received from the other control unit, the update time and update state of the received entry information are updated.

14. The method according to claim 13, comprising:

deleting the received entry information when the request to update the entry information is not received from the other control unit for a predetermined time period and a predetermined number of times;

deleting the received entry information when a request to delete the received entry information is received from the other control unit; and deleting the entry information corresponding to the accepted command in the storage unit when the accepted command is completed.

15. The method according to claim 11, wherein, when activation of the other control unit is recognized, the other control unit, which has been activated, is notified of the entry information stored in the storage unit.

16. The control unit according to claim 1, wherein the other control unit executes the command on behalf of the control terminal.

17. The control unit according to claim 1, wherein the other control unit in the storage apparatus is a master control unit or a slave control unit.

* * * * *

UNITED STATES PATENT AND TRADEMARK OFFICE
CERTIFICATE OF CORRECTION

| | | |
|---|---|---|
| PATENT NO. | : 8,601,224 B2 | Page 1 of 1 |
| APPLICATION NO. | : 12/534951 | |
| DATED | : December 3, 2013 | |
| INVENTOR(S) | : Tadashi Matumura et al. | |

It is certified that error appears in the above-identified patent and that said Letters Patent is hereby corrected as shown below:

In the Claims

In Column 15, Line 54, In Claim 6, delete "nit" and insert -- unit --, therefor.

Signed and Sealed this
Twenty-fifth Day of March, 2014

Michelle K. Lee
*Deputy Director of the United States Patent and Trademark Office*